US012649435B2

(12) United States Patent
Jaishanker

(10) Patent No.: US 12,649,435 B2
(45) Date of Patent: Jun. 9, 2026

(54) STRATEGIC PARKING TO IMPROVE SAFETY OF A PARKED VEHICLE ACCORDING TO LOCATION SELECTION AND BATTERY LIFE OPTIMIZATION

(71) Applicant: TOYOTA JIDOSHA KABUSHIKI KAISHA, Toyota (JP)

(72) Inventor: Vijay Saravana Jaishanker, Santa Clara, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 18/586,278

(22) Filed: Feb. 23, 2024

(65) Prior Publication Data

US 2025/0269819 A1     Aug. 28, 2025

(51) Int. Cl.
*B60R 25/01*          (2013.01)
(52) U.S. Cl.
CPC .................................... B60R 25/01 (2013.01)
(58) Field of Classification Search
CPC ...................................................... B60R 25/01
See application file for complete search history.

(56) References Cited

U.S. PATENT DOCUMENTS

| | | | |
|---|---|---|---|
| 9,230,440 B1 | 1/2016 | Penilla | |
| 9,811,085 B1 | 11/2017 | Hayes | |
| 10,363,796 B2 | 7/2019 | Decia | |
| 10,382,662 B1 | 8/2019 | Salmeron-Medrano | |
| 10,486,649 B1 | 11/2019 | Bennie | |

| | | | |
|---|---|---|---|
| 10,511,811 B2 | 12/2019 | Cho | |
| 11,408,745 B2 | 8/2022 | Higuchi | |
| 2011/0133957 A1 | 6/2011 | Harbach | |
| 2018/0313661 A1 | 11/2018 | Eyster | |
| 2019/0066505 A1 | 2/2019 | Salvucci | |

(Continued)

FOREIGN PATENT DOCUMENTS

GB          2592667 A   *   9/2021   .........   B60R 16/0232

OTHER PUBLICATIONS

Machine Translation of GB 2592667 A PDF File Name: "GB2592667A_Machine_Translation.pdf" (Year: 2021).*

(Continued)

*Primary Examiner* — Grant Moubry
*Assistant Examiner* — Ruben Picon-Feliciano
(74) *Attorney, Agent, or Firm* — SHEPPARD, MULLIN, RICHTER & HAMPTON LLP; Daniel N. Yannuzzi

(57)          ABSTRACT

Systems and methods are provided for identifying strategic parking for a vehicle. The systems and methods may receive parking data regarding a time, location of the vehicle, and parking duration of the vehicle. The systems and methods may survey a perimeter around the vehicle to determine a parking location according to the location of the vehicle. The systems and methods may determine a crime probability for the parking location according to the time and the parking duration. The systems and methods may determine a battery usage of the vehicle for the parking location according to the crime probability and a security measure to be performed. The systems and methods may generate a security plan for the vehicle according to the crime probability and the battery usage of the vehicle. The systems and methods may send the security plan to the vehicle for the vehicle to implement at the parking location.

20 Claims, 7 Drawing Sheets

(56)                         References Cited

U.S. PATENT DOCUMENTS

| | | |
|---|---|---|
| 2020/0191587 A1 | 6/2020 | Fuchs |
| 2021/0192384 A1 | 6/2021 | Sidener |
| 2021/0344051 A1 | 11/2021 | Nakhjiri |
| 2022/0219672 A1* | 7/2022 | Sasaki .................. B60W 10/08 |

OTHER PUBLICATIONS

Seymour, "Now Your Car Can Let You Know If It's Being Broken Into—Via Your Smartphone," Ford Media Center, Ford of Europe, Jun. 10, 2021, 2 pages (https://media.ford.com/content/fordmedia/feu/en/news/2021/06/10/now-your-car-can-let-you-know-if-its-being-broken-into--via-your.html).

* cited by examiner

100

LOGIC 130

110

120

150

Computing Component 600

Hardware Processors 602

Machine-Readable Storage Media 604

Receiving Parking Data regarding a Time, Location of a Vehicle, and Parking Duration 606

Surveying a Perimeter Around the Vehicle to Determine a Parking Location According to the Location of the Vehicle 608

Determining a Crime Probability for the Parking Location According to the Time and the Parking Duration 610

Determining a Battery Usage of the Vehicle for the Parking Location According to the Crime Probability and a Security Measure 612

Generating a Security Plan for the Vehicle According to the Crime Probability and the Battery Usage of the Vehicle for the Parking Location 614

Sending the Security Plan to the Vehicle for the Vehicle to Implement 616

FIG. 6

STRATEGIC PARKING TO IMPROVE SAFETY OF A PARKED VEHICLE ACCORDING TO LOCATION SELECTION AND BATTERY LIFE OPTIMIZATION

TECHNICAL FIELD

The present disclosure relates generally to the field of automotive protection, and more particularly, some implementations relate to systems and methods for identifying strategic parking for a vehicle to improve vehicle safety.

BACKGROUND OF THE INVENTION

Vehicles may be used as a means of transportation for the public. Vehicles may include automobiles, trucks, motorcycles, bicycles, scooters, mopeds, recreational vehicles and other like on- or off-road vehicles. Vehicles may further include autonomous, semi-autonomous and manual vehicles. As useful as a vehicle is for the transportation of persons, vehicles are also useful in the storage and transportation of other objects, both living (e.g., animals, insects, plants, etc.) and inanimate objects (e.g., furniture, clothes, books, appliances, etc.).

With vehicles being a primary source of transportation, the security of a vehicle, and any objects and property stored within, may be important to ensure the public's reliance and use of vehicles. When a vehicle is stationary, a person may rely more heavily on the security of the vehicle to safekeep any objects and property left in the vehicle. The reliance on vehicle security has become an ever increasing concern for vehicle owners when parking their vehicles due to the increasing number of vehicle break-ins and theft. While most conventional vehicles include security systems with various security components, such as, for example, cameras, sensors, etc., most security systems do not have a means to actively monitor a vehicle using such various security components without excessive reliance on the vehicle's battery. In some scenarios, a vehicle may be unable to utilize its security systems throughout an extended period of time as the vehicle's battery may be completely drained before the end of the period. This defect in the majority of current vehicular security systems may lead to incidents of trespassing and theft with stationary (e.g., parked) vehicles due to the vehicle running out of battery life to maintain the operation of its security system.

BRIEF SUMMARY OF THE DISCLOSURE

According to various aspects of the disclosed technology, systems and methods for identifying strategic parking for a vehicle to improve vehicle safety are provided.

In accordance with some implementations, a method for identifying strategic parking for a vehicle to improve vehicle safety is provided. The method may include: receiving, from the vehicle, parking data regarding a time, location of the vehicle, and parking duration of the vehicle; surveying a perimeter around the vehicle to determine a parking location according to the location of the vehicle; determining a crime probability for the parking location according to the time and the parking duration of the vehicle; determining a battery usage of the vehicle for the parking location according to the crime probability and a security measure to be performed; generating a security plan for the vehicle according to the crime probability and the battery usage of the vehicle for the parking location; and sending, to the vehicle, the security plan for the vehicle to implement at the parking location.

In some applications, the method may further include: analyzing a plurality of crime probabilities for a plurality of parking locations according to the location of the vehicle, wherein the plurality of crime probabilities may include the crime probability and the plurality of parking locations may include the parking location; analyzing a plurality of battery usage of the vehicle for the plurality of parking locations, wherein the plurality of battery usage may include the battery usage for the parking location; determining an optimal parking location for the vehicle to park from the plurality of parking locations according to the analysis of the plurality of crime probabilities and the analysis of the plurality of battery usage; and sending, to the vehicle, the optimal parking location, crime probability for the optimal parking location, and battery usage of the vehicle for the optimal parking location.

In some applications, the time may include a second, minute, hour, day, week, month, and year of a particular moment.

In some applications, the parking duration may include an overall period of time for parking the vehicle.

In some applications, the determining the crime probability for the parking location may include: receiving crime data of the parking location; training a crime model using the crime data; and calculating the crime probability for the parking location according to the crime model, the time, and the parking duration of the vehicle.

In some applications, the crime data may include information on a history of crime occurring at a particular location, with the history of crime including a total number of crimes, types of crimes, results of crimes, and level of security.

In some applications, the crime probability may include a plurality of likelihood of crime percentages at a plurality of time periods throughout the parking duration.

In some applications, the determining the battery usage of the vehicle may include: determining the security measure to be performed at a plurality of time periods throughout the parking duration according to the crime probability; calculating a plurality of battery life to be consumed at the plurality of time periods throughout the parking duration according to the security measure to be performed; and generating the battery usage of the vehicle by combining the plurality of battery life of the plurality of time periods throughout the parking duration.

In some applications, the determining the battery usage of the vehicle may include: receiving stored battery usage data from a database, with the stored battery usage data including information of recorded battery usage of a first vehicle for the parking location, wherein the first vehicle has similar specifications to the vehicle; determining the security measure to be performed at a plurality of time periods throughout the parking duration according to the crime probability; calculating a plurality of battery life to be consumed at the plurality of time periods throughout the parking duration according to the security measure to be performed and the stored battery usage data; and generating the battery usage of the vehicle by combining the plurality of battery life of the plurality of time periods throughout the parking duration.

In some applications, the security measure may include at least one of recording with a camera, activating a security system, monitoring motion around and on the vehicle, and monitoring audio around the vehicle, with the security measure to be performed being based on the crime probability.

In some applications, the method may further include: receiving information of a selected parking location from the vehicle; generating a second security plan for the vehicle according to a second crime probability and a second battery usage of the vehicle for the selected parking location; and sending the second security plan to the vehicle for the vehicle to implement at the selected parking location.

In some applications, the security plan may include a sequence of security measures to be performed by the vehicle according to the crime probability and the battery usage for the parking location.

In some applications, the method may further include: receiving, from the vehicle, information that a crime is being performed on the vehicle; and sending a notification of the crime being performed to a device.

In another aspect, a system identifying strategic parking for a vehicle to improve vehicle safety is provided that may include one or more processors; and memory coupled to the one or more processors to store instructions, which when executed by the one or more processors, may cause the one or more processors to perform operations. The operations may include: receiving parking data regarding a time, location of the vehicle, and parking duration of the vehicle; surveying a perimeter around the vehicle to determine a parking location according to the location of the vehicle; determining a crime probability for the parking location according to the time and the parking duration of the vehicle; determining a battery usage of the vehicle for the parking location according to the crime probability and a security measure to be performed; generating a security plan for the vehicle according to the crime probability and the battery usage of the vehicle for the parking location; and sending the security plan to the vehicle for the vehicle to implement at the parking location.

In some applications, the system may further include operations comprising: analyzing a plurality of crime probabilities for a plurality of parking locations according to the location of the vehicle, wherein the plurality of crime probabilities may include the crime probability and the plurality of parking locations may include the parking location; analyzing a plurality of battery usage of the vehicle for the plurality of parking locations, wherein the plurality of battery usage may include the battery usage for the parking location; determining an optimal parking location for the vehicle to park from the plurality of parking locations according to the analysis of the plurality of crime probabilities and the analysis of the plurality of battery usage; and sending the optimal parking location, crime probability for the optimal parking location, and battery usage of the vehicle for the optimal parking location to the vehicle.

In some applications, the time may include a second, minute, hour, day, week, month, and year of a particular moment.

In some applications, the parking duration may include an overall period of time for parking the vehicle.

In some applications, the determining the crime probability for the parking location may include: receiving crime data of the parking location; training a crime model using the crime data; and calculating the crime probability for the parking location according to the crime model, the time, and the parking duration of the vehicle.

In some applications, the crime data may include information on a history of crime occurring at a particular location, with the history of crime including a total number of crimes, types of crimes, results of crimes, and level of security.

In some applications, the crime probability may include a plurality of likelihood of crime percentages at a plurality of time periods throughout the parking duration.

In some applications, the determining the battery usage of the vehicle may include: determining the security measure to be performed at a plurality of time periods throughout the parking duration according to the crime probability; calculating a plurality of battery life to be consumed at the plurality of time periods throughout the parking duration according to the security measure to be performed; and generating the battery usage of the vehicle by combining the plurality of battery life of the plurality of time periods throughout the parking duration.

In some applications, the determining the battery usage of the vehicle may include: receiving stored battery usage data from a database, with the stored battery usage data including information of recorded battery usage of a first vehicle for the parking location, wherein the first vehicle has similar specifications to the vehicle; determining the security measure to be performed at a plurality of time periods throughout the parking duration according to the crime probability; calculating a plurality of battery life to be consumed at the plurality of time periods throughout the parking duration according to the security measure to be performed and the stored battery usage data; and generating the battery usage of the vehicle by combining the plurality of battery life of the plurality of time periods throughout the parking duration.

In some applications, the security measure may include at least one of recording with a camera, activating a security system, monitoring motion around and on the vehicle, and monitoring audio around the vehicle, with the security measure to be performed being based on the crime probability.

In some applications, the system may further include operations comprising: receiving information of a selected parking location from the vehicle; generating a second security plan for the vehicle according to a second crime probability and a second battery usage of the vehicle for the selected parking location; and sending the second security plan to the vehicle for the vehicle to implement at the selected parking location.

In some applications, the security plan may include a sequence of security measures to be performed by the vehicle according to the crime probability and the battery usage for the parking location.

In some applications, the system may further include operations comprising: receiving information that a crime is being performed on the vehicle; and sending a notification of the crime being performed to a device.

In another aspect, a non-transitory machine-readable medium is provided. The non-transitory computer-readable medium may include instructions that when executed by a processor may cause the processor to perform operations including: receiving parking data regarding a time, location of a vehicle, and parking duration of the vehicle; surveying a perimeter around the vehicle to determine a parking location according to the location of the vehicle; determining a crime probability for the parking location according to the time and the parking duration of the vehicle; determining a battery usage of the vehicle for the parking location according to the crime probability and a security measure to be performed; generating a security plan for the vehicle according to the crime probability and the battery usage of the vehicle for the parking location; and sending the security plan to the vehicle for the vehicle to implement at the parking location.

In some applications, the non-transitory machine-readable medium may further include operations comprising: analyzing a plurality of crime probabilities for a plurality of parking locations according to the location of the vehicle, wherein the plurality of crime probabilities may include the crime probability and the plurality of parking locations may include the parking location; analyzing a plurality of battery usage of the vehicle for the plurality of parking locations, wherein the plurality of battery usage may include the battery usage for the parking location; determining an optimal parking location for the vehicle to park from the plurality of parking locations according to the analysis of the plurality of crime probabilities and the analysis of the plurality of battery usage; and sending the optimal parking location, crime probability for the optimal parking location, and battery usage of the vehicle for the optimal parking location to the vehicle.

In some applications, the time may include a second, minute, hour, day, week, month, and year of a particular moment.

In some applications, the parking duration may include an overall period of time for parking the vehicle.

In some applications, the determining the crime probability for the parking location may include: receiving crime data of the parking location; training a crime model using the crime data; and calculating the crime probability for the parking location according to the crime model, the time, and the parking duration of the vehicle.

In some applications, the crime data may include information on a history of crime occurring at a particular location, with the history of crime including a total number of crimes, types of crimes, results of crimes, and level of security.

In some applications, the crime probability may include a plurality of likelihood of crime percentages at a plurality of time periods throughout the parking duration.

In some applications, the determining the battery usage of the vehicle may include: determining the security measure to be performed at a plurality of time periods throughout the parking duration according to the crime probability; calculating a plurality of battery life to be consumed at the plurality of time periods throughout the parking duration according to the security measure to be performed; and generating the battery usage of the vehicle by combining the plurality of battery life of the plurality of time periods throughout the parking duration.

In some applications, the determining the battery usage of the vehicle may include: receiving stored battery usage data from a database, with the stored battery usage data including information of recorded battery usage of a first vehicle for the parking location, wherein the first vehicle has similar specifications to the vehicle; determining the security measure to be performed at a plurality of time periods throughout the parking duration according to the crime probability; calculating a plurality of battery life to be consumed at the plurality of time periods throughout the parking duration according to the security measure to be performed and the stored battery usage data; and generating the battery usage of the vehicle by combining the plurality of battery life of the plurality of time periods throughout the parking duration.

In some applications, the security measure may include at least one of recording with a camera, activating a security system, monitoring motion around and on the vehicle, and monitoring audio around the vehicle, with the security measure to be performed being based on the crime probability.

In some applications, the non-transitory machine-readable medium may further include operations comprising: receiving information of a selected parking location from the vehicle; generating a second security plan for the vehicle according to a second crime probability and a second battery usage of the vehicle for the selected parking location; and sending the second security plan to the vehicle for the vehicle to implement at the selected parking location.

In some applications, the security plan may include a sequence of security measures to be performed by the vehicle according to the crime probability and the battery usage for the parking location.

In some applications, the non-transitory machine-readable medium may further include operations comprising: receiving information that a crime is being performed on the vehicle; and sending a notification of the crime being performed to a device.

Other features and aspects of the disclosed technology will become apparent from the following detailed description, taken in conjunction with the accompanying drawings, which illustrate, by way of example, the features in accordance with applications of the disclosed technology. The summary is not intended to limit the scope of any inventions described herein, which are defined solely by the claims attached hereto.

BRIEF DESCRIPTION OF THE DRAWINGS

The present disclosure, in accordance with one or more various applications, is described in detail with reference to the following figures. The figures are provided for purposes of illustration only and merely depict typical or example applications.

FIG. 6 is an example illustration of a computing component that includes one or more hardware processors and machine-readable storage media storing a set of machine-readable/machine-executable instructions that, when executed, cause the one or more hardware processors to perform an illustrative method for identifying strategic parking for a vehicle, according to example embodiments described in the present disclosure.

Figure 1:
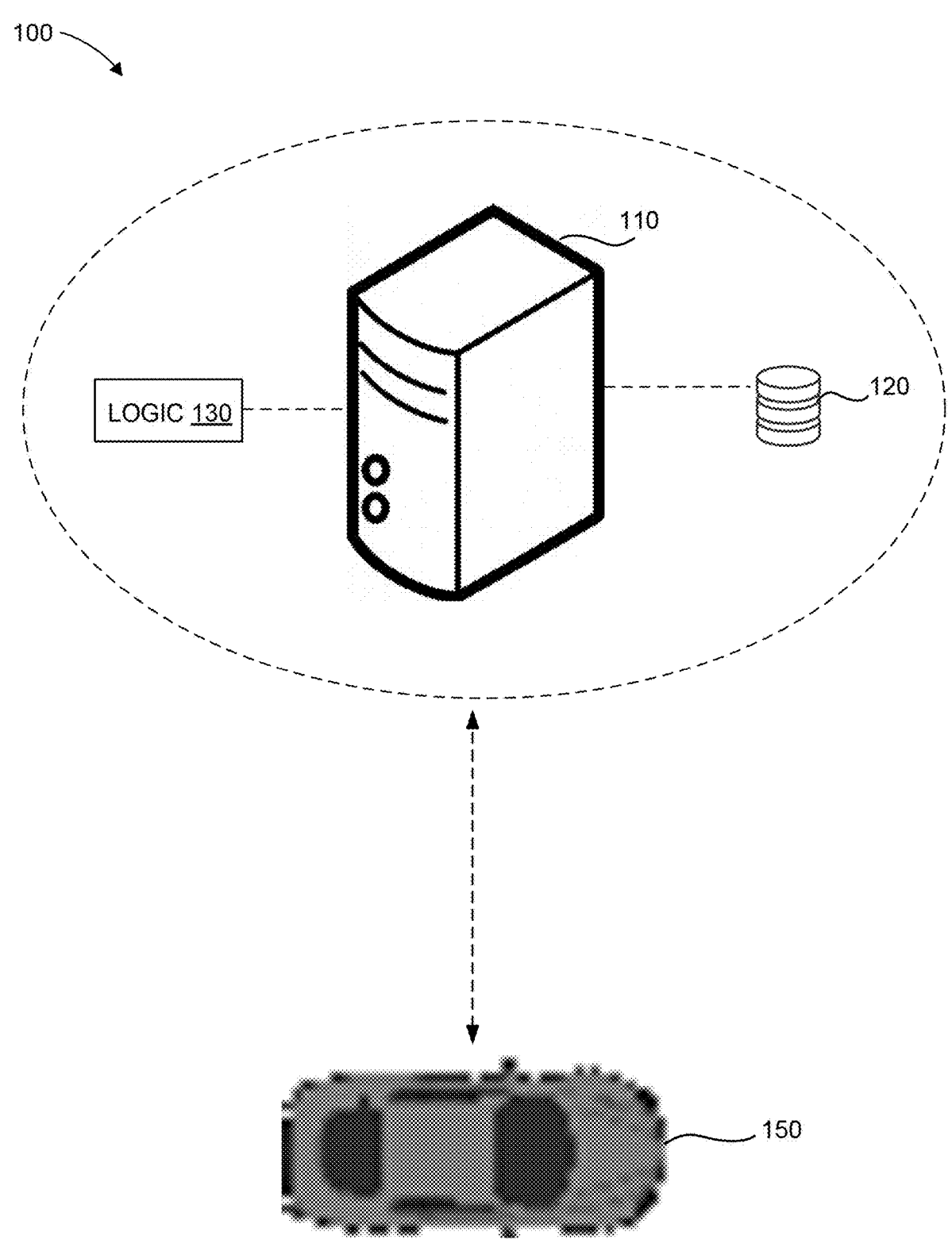
FIG. 1 is an example illustration of a computing system for identifying strategic parking for a vehicle, according to example applications described in the present disclosure.

The figures are not exhaustive and do not limit the present disclosure to the precise form disclosed.

DETAILED DESCRIPTION

As described above, vehicles may be used as a means of transportation. As useful as a vehicle is for the transportation of persons, vehicles are also useful in the storage and transportation of other objects, both living (e.g., animals, insects, plants, etc.) and inanimate objects (e.g., furniture, clothes, books, appliances, etc.). When a vehicle is parked and stationary, a person may rely on in/on-vehicle security mechanism(s) to safeguard any objects and property left in the vehicle. While most conventional vehicles include security systems with various security components, such as, for example, cameras, sensors, etc., most security systems do not have a means to actively monitor a vehicle using such various security components without relying on the vehicle's battery to power such security systems. In some scenarios, a vehicle may be unable to utilize its security systems throughout an extended period of time as the vehicle's battery may be completely drained before the end of the period, explained in another manner, the battery state of charge (SOC) may be at or near zero percent. This defect in the majority of current security systems may lead to incidents of trespassing and theft with stationary vehicles due to the vehicle running out of battery life to maintain the operation of its security system. This defect may further lead individuals to deactivate the security systems of their vehicle to avoid the risk of having their vehicle run out of battery life and being unable to operate the vehicle upon their return.

Aspects of the technology disclosed herein may provide systems and methods configured to identify strategic parking for a vehicle to improve vehicle safety/security. A driver of an ego vehicle may use the ego vehicle to travel to a particular location. The ego vehicle may include, for example, an automobile, truck, motorcycle, bicycle, scooter, moped, recreational vehicle and other like on- or off-road vehicles. The ego vehicle may include, for example, an autonomous, semi-autonomous and manual operation. After arriving at the particular location, the driver may want to park the ego vehicle at or around the particular location. The driver may initiate parking of the ego vehicle by activating a strategic parking system.

The ego vehicle may collect parking data including, for example, a time, location, and parking duration of the ego vehicle when the strategic parking system is activated. The time may include, for example, a second, minute, hour, day, week, month, and year of a precise moment when the strategic parking system is activated. The location may include, for example, the geographical location of the ego vehicle when the strategic parking system is activated. The parking duration may include, for example, a period of time that the ego vehicle will be parked.

The ego vehicle may collect parking data from input received by the driver when the strategic parking system is activated. The ego vehicle may include one or more sensors that may be used to collect parking data of the ego vehicle. The sensors may include, for example, a camera, image sensor, radar sensor, environmental sensor, light detection and ranging (LiDAR) sensor, electromyography sensor, motion sensor, pressure sensor, position sensor, audio sensor, infrared sensor, microwave sensor, optical sensor, haptic sensor, magnetometer, communication system and global positioning system (GPS). Data may be received by at least one sensor of the ego vehicle.

If parking data is not received by the driver or by at least one sensor of the ego vehicle, then the strategic parking system may assume the missing parking data. For example, one or more sensors of the ego vehicle may be used to collect the parking data of the time and the location of the ego vehicle when the strategic parking system is activated. The strategic parking system may not receive any parking data of the parking duration from the ego vehicle. The strategic parking system may assume the parking duration according to one or more contributing factors, including, for example, the location of the ego vehicle, the time of day, recorded parking data of previous events with the same or similar environmental settings, etc. The strategic parking system may receive the parking data of the time, location and parking duration from the ego vehicle.

After the strategic parking system is activated and parking data is received from the ego vehicle (or assumed), the system may survey a perimeter around the location of the ego vehicle. Surveying the perimeter around the location of the ego vehicle may determine one or more parking locations available for the ego vehicle to park at. A size of the perimeter around the location of the ego vehicle may be preset. The size of the perimeter around the location of the ego vehicle may be adjusted according to one or more contributing factors, including, for example, a maximum distance away from the location of the ego vehicle chosen by the driver, a surrounding environment around the location of the ego vehicle, an availability of parking locations around the location of the ego vehicle, a minimum number of parking locations to be found, etc. Many variations are possible.

The strategic parking system may use a parking location determined from surveying the perimeter around the ego vehicle to determine a crime probability of the parking location. To determine the crime probability of the parking location, the system may receive crime data of the parking location. The crime data may include, for example, information on a history of crime occurring at a particular location, such as, for example, a total number of crimes, types of crimes, results of crimes, level of security, frequency of crimes (i.e., times of day, week, month and year that crimes occur), etc. at the particular location. The level of security may include the types of security, frequency of security, and intensity of security. The crime data of the parking location may include information on every crime that occurred at the parking location. The crime data of the parking location may only include information on vehicle-related crimes that occurred at the parking location. Many variations are possible.

The crime data of the parking location may be used to train a crime model. The crime model may be a machine learning (ML) model. The crime model may be used to predict the occurrence of crimes at the parking location. The crime model, along with the parking data indicating the time and the parking duration of the ego vehicle, may be used to calculate the crime probability of the parking location. The crime probability of the parking location for the ego vehicle may include a plurality of vectors between zero (0) and one (1). The crime probability may include a threshold that is used to adjust the value of the plurality of vectors to be either a value of zero (0) or a value of one (1), with zero (0) representing a "no" to crime probability and one (1) representing a "yes" to crime probability. The threshold may be any value between zero (0) and one (1). The threshold may be preset, or it may be adjusted according to one or more contributing factors, including the parking data received.

The crime probability of the parking location for the ego vehicle may include a plurality of percentages of a likelihood that a crime may be committed at various times throughout the parking duration of the ego vehicle. For example, the crime probability of a first parking location, with a time of 7:00 pm and parking duration of two (2) hours, may display a zero (0) percent likelihood of a crime occurring from 7:00 pm to 7:45 pm, a 15 percent likelihood of a crime occurring from 7:46 pm to 8:00 pm, a five (5)

percent likelihood of a crime occurring from 8:01 pm to 8:30 pm, and an eight (8) percent likelihood of a crime occurring from 8:31 pm to 9:00 pm, with 9:00 pm being the end of the parking duration. Many variations are possible. The system may determine a crime probability for each of the parking locations at each of the plurality of vectors throughout the parking duration, determined from surveying the perimeter around the ego vehicle, according to the time and the parking duration.

The strategic parking system may use the crime probability to determine a security measure to be performed at a plurality of time periods throughout the parking duration. The security measure to be performed may include, for example, activating a security system, recording with a camera, monitoring motion around and on the ego vehicle, monitoring audio around the ego vehicle, etc. The security measure to be performed may be based on the crime probability. The security measure to be performed may dynamically increase and decrease according to one or more factors, including the crime probability, battery life of the ego vehicle, etc. For example, a crime probability of 15 percent for a time period of 10 minutes may cause the security measure of recording with a camera of the ego vehicle to be performed. In another example, a crime probability of 15 percent for a time period of 30 minutes may cause the security measure of monitoring motion around and on the ego vehicle to be performed. As another example, a crime probability of five (5) percent for 30 minutes may result in the performance of the security measure of only monitoring audio around the ego vehicle. Many variations are possible.

Using the security measure to be performed according to the crime probability, the strategic parking system may calculate a plurality of battery life at the plurality of time periods throughout the parking duration. For example, the strategic parking system may calculate that a battery life of 20 percent may be consumed to operate a security measure of recording with a camera of the ego vehicle for a time period of 10 minutes. In another example, the strategic parking system may calculate that a battery life of 15 percent may be consumed to operate a security measure of monitoring motion around and on the ego vehicle for a time period of 30 minutes. As another example, the strategic parking system may calculate that a battery life of five (5) percent may be consumed to operate a security measure of only monitoring audio around the ego vehicle for a time period of 30 minutes. Many variations are possible.

The strategic parking system may receive stored battery usage data from a database (e.g., local database, remote database, etc.). The database may be stored and accessed from a local memory of the ego vehicle, from local memories of other vehicles, and a remote online memory. The stored battery usage data may include, for example, information of recorded battery usage of one or more other vehicles for the parking location. The one or more other vehicles may include specifications similar to or exactly the same as the ego vehicle. The stored battery usage data may provide more accurate information that may be used along with the determined security measure to calculate the plurality of battery life at the plurality of time periods.

Once the plurality of battery life at the plurality of time periods is calculated, the strategic parking system may generate the battery usage (or estimated battery usage) of the ego vehicle. The battery usage of the ego vehicle may be the total amount of battery or power from the ego vehicle that is required (or estimated to be required) to operate one or more security measures throughout the parking duration at the parking location. The battery usage of the ego vehicle may be generated by combining the plurality of battery life calculated for the entire parking duration.

The crime probability, the battery usage and the parking location information may be sent to the ego vehicle for the driver to view. The crime probability, the battery usage and the parking location information may be displayed on a graphical user interface (GUI) of the ego vehicle.

The strategic parking system may use the crime probability and battery usage associated with the parking location to generate a security plan for the ego vehicle. The security plan may include a sequence of security measures to be performed by the ego vehicle according to the crime probability and the battery usage associated with the parking location. The security plan may be sent to the ego vehicle for the ego vehicle to implement at the parking location. In this way, the ego vehicle may implement one or more security measures according to the security plan to adequately monitor the ego vehicle throughout the parking duration at the parking location. This may allow the security system of the ego vehicle to be efficiently used to keep the ego vehicle safe and secure throughout the parking duration without causing the ego vehicle to use all of its battery or power.

The strategic parking system may determine a plurality of crime probabilities and a plurality of battery usage for a plurality of parking locations determined from surveying a perimeter around the ego vehicle. The plurality of crime probabilities, the plurality of battery usage and the plurality of parking locations may be sent to the ego vehicle and displayed as a list to display the differences in crime probability and battery usage for each of the plurality of parking locations. The list of the plurality of crime probabilities, the plurality of battery usage and the plurality of parking locations may be sent to the ego vehicle for the driver to view.

The list of the plurality of crime probabilities, the plurality of battery usage and the plurality of parking locations may be displayed on a graphical user interface (GUI) of the ego vehicle. The list of the plurality of crime probabilities, the plurality of battery usage and the plurality of parking locations may be arranged in order of the parking location that is the closest to the location of the ego vehicle. The list of the plurality of crime probabilities, the plurality of battery usage and the plurality of parking locations may be arranged in order of the parking location with the lowest crime probability based on the parking data received. The list of the plurality of crime probabilities, the plurality of battery usage and the plurality of parking locations may be arranged in order of the parking location with the lowest battery usage (or lowest estimated battery usage) based on the parking data received. The list of the plurality of crime probabilities, the plurality of battery usage and the plurality of parking locations may be arranged in order of the parking location with the shortest distance from the location of the ego vehicle. Many variations are possible.

The strategic parking system may analyze the plurality of crime probabilities for the plurality of parking locations. Analyzing the plurality of crime probabilities for the plurality of parking locations may determine which parking location of the plurality of parking locations has the lowest crime probability for the ego vehicle based on the parking data received. The strategic parking system may analyze the plurality of battery usage for the plurality of parking locations. Analyzing the plurality of battery usage for the plurality of parking locations may determine which parking location of the plurality of parking locations has the lowest battery usage (or lowest estimated battery usage) of the ego vehicle when operating one or more security measures based on the parking data received.

Using the analysis of the plurality of crime probabilities and the analysis of the plurality of battery usage, the strategic parking system may determine which of the plurality of parking locations may be the optimal parking location for the ego vehicle based on the parking data received. The optimal parking location for the ego vehicle may be the parking location that has the optimal, weighted combination of crime probability and battery usage for the ego vehicle based on the received parking data. As an example, the optimal parking location with the optimal, weighted combination of crime probability and battery usage may be the parking location with the lowest crime probability and the lowest battery usage (or lowest estimated battery usage) based on the received parking data for the ego vehicle.

The strategic parking system may use the analysis of the plurality of crime probabilities and the plurality of battery usage with location information, including, for example, the location of the ego vehicle, the location of a current destination, and the location of a future destination, to determine an optimal parking location for the ego vehicle. The current destination may be a place, such as, for example, a restaurant, store, house, etc., that a driver of the ego vehicle may be going to upon parking the ego vehicle. The future destination may be a place, such as, for example, a charging station, house, gas station, etc., that the driver of the ego vehicle may be going to after arriving back to the parked ego vehicle to recharge or refuel the ego vehicle. In this way, the strategic parking system may determine an optimal parking location for the ego vehicle that may allow the ego vehicle to be efficiently monitored using one or more security measures throughout the parking duration while also ensuring the ego vehicle may have sufficient battery life remaining to allow the ego vehicle to reach a future destination to recharge or refuel.

The optimal parking location for the ego vehicle may be the parking location with the optimal, weighted combination of one or more of the crime probability, battery usage, distance from the location of the ego vehicle, distance from the location of the current destination, and distance from the location of the future destination. As an example, a first parking location may have a crime probability of 30 percent, a battery usage of 70 percent and a distance from the current location of the ego vehicle of 0.1 miles. A second parking location may have a crime probability of 30 percent, a battery usage of 30 percent and a distance from the current location of the ego vehicle of 1 mile. The optimal parking location with the optimal, weighted combination of crime probability, battery usage, and distance from the ego vehicle's location may be determined to be the second parking location. As another example, a first parking location may have a crime probability of 25 percent, a battery usage of 80 percent, a distance from the location of the current destination of 1.1 miles, and a distance from the location of the future destination of 25 miles. A second parking location may have a crime probability of 20 percent, a battery usage of 85 percent, a distance from the location of the current destination of 0.2 miles, and a distance from the location of the future destination of 23.5 miles. The optimal parking location with the optimal, weighted combination of crime probability, battery usage, distance from the current destination location, and distance from the future destination location may be determined to be the first parking location. Many variations are possible.

The optimal parking location, along with its respective crime probability, battery usage, and distance of the optimal parking location from the location of the ego vehicle, may be sent to the ego vehicle for the driver to view. The optimal parking location, along with its respective crime probability, battery usage, and distance of the optimal parking location from the location of the ego vehicle, may be highlighted in the list of the plurality of crime probabilities, the plurality of battery usage and the plurality of parking locations sent to the ego vehicle. The optimal parking location, along with its respective crime probability, battery usage, and distance of the optimal parking location from the location of the ego vehicle, may be placed on the top of the list of the plurality of crime probabilities, the plurality of battery usage and the plurality of parking locations sent to the ego vehicle. Information of a minimum battery life needed for the ego vehicle to reach the future destination location may also be sent to the ego vehicle for the driver to view. Many variations are possible.

After the strategic parking system sends the list of the plurality of crime probabilities, the plurality of battery usage and the plurality of parking locations sent to the ego vehicle, the driver may view the list and select a parking location to park the ego vehicle at. The strategic parking system may receive information of the selected parking location from the ego vehicle. The strategic parking system may use the crime probability and battery usage associated with the selected parking location to generate a security plan for the ego vehicle. The security plan may include a sequence of security measures to be performed by the ego vehicle according to the crime probability and the battery usage associated with the selected parking location. The security plan may be sent to the ego vehicle for the ego vehicle to implement at the selected parking location. In this way, the ego vehicle may implement one or more security measures according to the security plan to adequately monitor the ego vehicle throughout the parking duration at the selected parking location. This may allow the security system of the ego vehicle to be efficiently used to keep the ego vehicle safe and secure throughout the parking duration without causing the ego vehicle to use all of its battery or power.

As the ego vehicle is operating its security system according to the security plan provided by the strategic system, the ego vehicle may collect information that a crime is being performed on the ego vehicle. The ego vehicle may collect the crime performance information from at least one sensor of the ego vehicle. The strategic parking system may receive the crime performance information from the ego vehicle. The strategic parking system may send a notification of the crime being performed to a device. The device may be associated to one or more entities, including, for example, the driver of the ego vehicle, an admin of the strategic parking system, a law enforcement agency, a security agency, etc. Many variations are possible.

It should be noted that the terms "accurate," "accurately," and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example of a computing system 100 which may be internal or otherwise associated within a vehicle 150. In some embodiments, the computing system 100 may be a machine learning (ML) pipeline and model, and use ML algorithms. In some examples, the vehicle 150 may be a vehicle, such as an automobile, truck, motorcycle, bicycle, scooter, moped, recreational vehicle and other like on- or off-road vehicles. The vehicle 150 may input data into computing component 110. The computing component 110 may perform one or more available operations on the input data to generate outputs, such as receive parking data regarding a time, location and parking duration of the vehicle 150, survey a perimeter around the vehicle 150 to determine a parking location, determine a crime probability for the parking location, determine a battery usage of the vehicle 150 for the parking location, send the crime probability, the battery usage, and the parking location to the vehicle 150, analyze a plurality of crime probabilities for a plurality of parking locations, analyze a plurality of battery usage for the plurality of parking locations, determine an optimal parking location for the vehicle 150, and generate a security plan for the vehicle 150. The vehicle 150 may further display the outputs on a Graphical User Interface (GUI). The GUI may be in vehicle 150 or on a computing device, such as a desktop computer, a laptop, a mobile phone, a tablet device, an Internet of Things (IoT) device, etc. The GUI may display the outputs as a two-dimensional (2D) and three-dimensional (3D) layout and map showing the various outputs generated by algorithms, such as ML algorithms, based on various input data, such as parking data including the time, location, and parking duration from vehicle 150.

The computing system 110 in the illustrated example may include one or more processors and logic 130 that implements instructions to carry out the functions of the computing component 110, for example, receiving parking data regarding a time, location of the vehicle, and parking duration of the vehicle, surveying a perimeter around the vehicle to determine a parking location according to the location of the vehicle, determining a crime probability for the parking location according to the time and the parking duration of the vehicle, determining a battery usage of the vehicle for the parking location according to the crime probability and a security measure to be performed, and sending the crime probability, the battery usage of the vehicle, and the parking location to the vehicle. The computing component 110 may store, in a database 120, details regarding scenarios or conditions in which some algorithms, image datasets, and assessments are performed and used to survey a perimeter for a parking location, determine a crime probability for the parking location, determining a battery usage of the vehicle for the parking location, analyze a plurality of crime probabilities for a plurality of parking locations, analyze a plurality of battery usage for the plurality of parking locations, determine an optimal parking location for the vehicle, and generate a security plan for the vehicle. Some of the scenarios or conditions will be illustrated in the subsequent figures.

A processor may include one or more GPUs, CPUs, microprocessors or any other suitable processing system. Each of the one or more processors may include one or more single core or multicore processors. The one or more processors may execute instructions stored in a non-transitory computer readable medium. Logic 130 may contain instructions (e.g., program logic) executable by the one or more processors to execute various functions of computing component 110. Logic 130 may contain additional instructions as well, including instructions to transmit data to, receive data from, and interact with vehicle 150.

ML can refer to methods that, through the use of algorithms, are able to automatically extract intelligence or rules from training data sets and capture the same in informative models. In turn, those models are capable of making predictions based on patterns or inferences gleaned from subsequent data input into a trained model. According to implementations of the disclosed technology, the ML algorithm comprises, among other aspects, algorithms implementing a Gaussian process and the like. The ML algorithms disclosed herein may be supervised and/or unsupervised depending on the implementation. The ML algorithms may emulate the observed characteristics and components of vehicles, road, and drivers to better evaluate the environment around an ego vehicle to determine a plurality of parking locations, determine a plurality of crime probabilities for the plurality of parking locations, determine a plurality of battery usage of the ego vehicle for the plurality of parking locations, analyze the plurality of crime probabilities, analyze the plurality of battery usage, determine an optimal parking location for the ego vehicle, and generate a security plan for the ego vehicle to improve vehicle safety of the ego vehicle.

Although one example computing system 110 is illustrated in FIG. 1, in various embodiments multiple computing systems 110 can be included. Additionally, one or more systems and subsystems of computing system 100 can include its own dedicated or shared computing component 110, or a variant thereof. Accordingly, although computing system 100 is illustrated as a discrete computing system, this is for ease of illustration only, and computing system 100 can be distributed among various systems or components. The computing component 110 may be, for example, the computing system 210 of FIG. 2, the strategic parking system 300 of FIG. 3, the strategic parking system 400 of FIG. 4, the process 500 of FIG. 5, the computing component 600 of FIG. 6 and the computing component 700 of FIG. 7.

Figure 2:
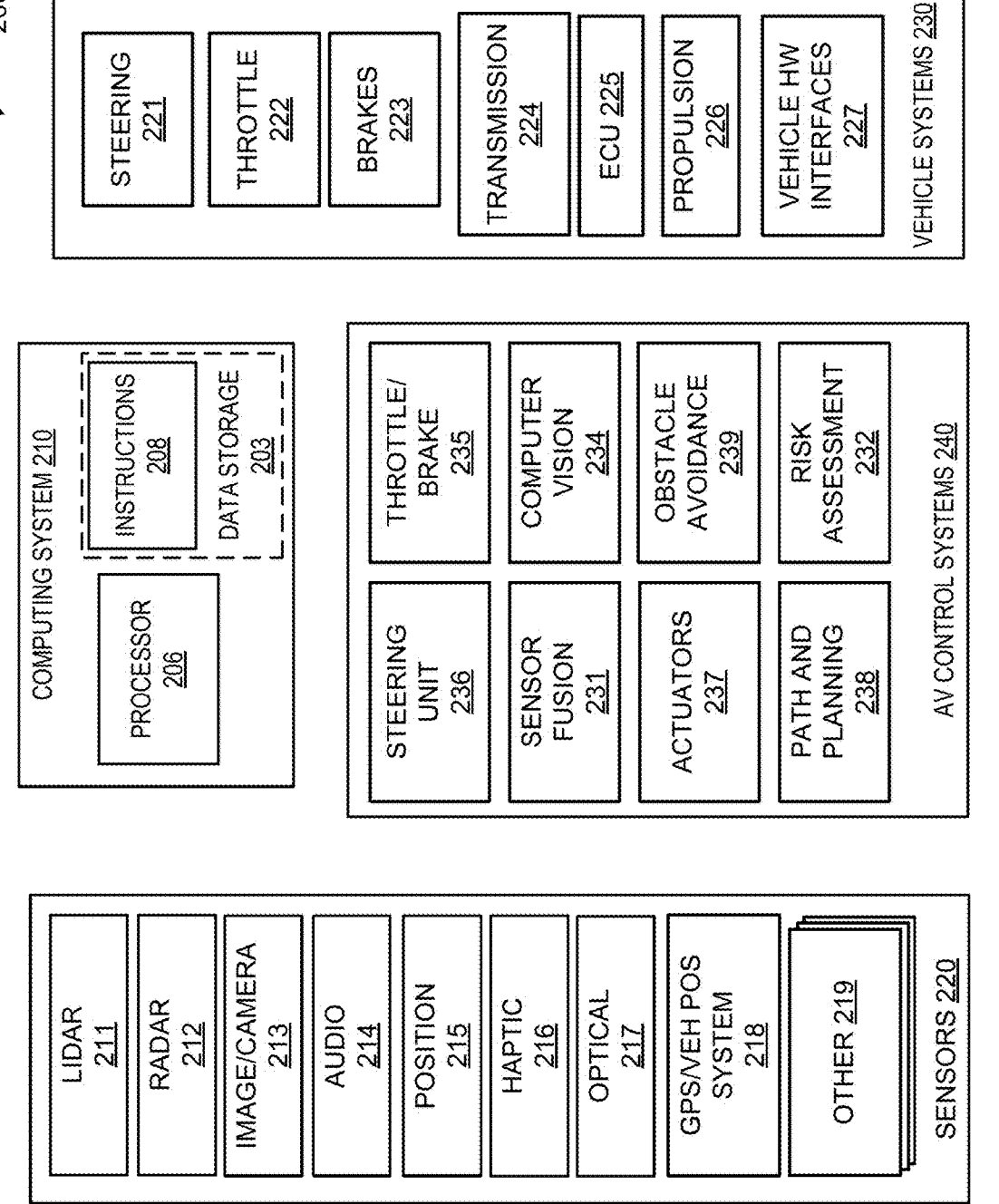
FIG. 2 is an example illustration of a vehicle with which applications of the disclosed technology may be implemented.

FIG. 2 is a schematic representation of various components or elements of an example connected vehicle 200, such as an autonomous, semi-autonomous or manual vehicle, with which applications of the disclosed technology may be implemented. As described herein, vehicle 200 can refer to a vehicle, such as an automobile, truck, motorcycle, bicycle, scooter, moped, recreational vehicle and other like on- or off-road vehicles, that may include an autonomous, semi-autonomous and manual operation. The vehicle 200 may include components, such as a computing system 210, sensors 220, AV control systems 240 and vehicle systems 230. Either of the computing system 210, sensors 220, AV control systems 240, and vehicle systems 230 can be part of an automated vehicle system/advanced driver assistance system (ADAS). ADAS can provide navigation control signals (i.e., control signals to actuate the vehicle and operate one or more vehicle systems 230 as shown in FIG. 2) for the vehicle to navigate a variety of situations. As used herein, ADAS can be an autonomous vehicle control system adapted for any level of vehicle control and driving autonomy. For example, the ADAS can be adapted for level 1, level 2, level 3, level 4, and level 5 autonomy (according to SAE standard). ADAS can allow for control mode blending (i.e., blending of autonomous and assisted control modes with human driver control). ADAS can correspond to a real-time machine perception system for vehicle actuation in a multi-vehicle environment. Vehicle 200 may include a greater or fewer quantity of systems and subsystems, and each could include multiple elements. Accordingly, one or more of the functions of the technology disclosed herein may be divided into additional functional or physical components, or combined into fewer functional or physical components. Additionally, although the systems and subsystems illustrated in FIG. 2 are shown as being partitioned in a particular way, the functions of vehicle 200 can be partitioned in other ways. For example, various vehicle systems and subsystems can be combined in different ways to share functionality.

Sensors 220 may include a plurality of different sensors to gather data regarding vehicle 200, its operator, its operation and its surrounding environment. Although various sensors are shown, it can be understood that systems and methods for detecting and responding to intervening obstacles may not require many sensors. It can also be understood that system and methods described herein can be augmented by sensors off the vehicle 200. In this example, sensors 220 include light detection and ranging (LiDAR) sensor 211, radar sensor 212, image sensors 213 (e.g., a camera), audio sensors 214, position sensor 215, haptic sensor 216, optical sensor 217, a Global Positioning System (GPS) or other vehicle positioning system 218, and other like distance measurement and environment sensing sensors 219. Sensors 220 may further include security sensors to monitory the security of the vehicle 200 when the vehicle is parked and stationary. One or more of the sensors 220 may gather data, such as environmental data and parking data, such as, for example, time, location, and parking duration, and send that data to the vehicle electronic control unit (ECU) or other processing unit. Sensors 220 (and other vehicle components) may be duplicated for redundancy.

Distance measuring sensors such as LiDAR sensor 211, radar sensor 212, IR sensors and other like sensors can be used to gather data to measure distances and closing rates to various external objects such as other vehicles, roads, traffic signs, pedestrians, light poles and other objects. Image sensors 213 can include one or more cameras or other image sensors to capture images of the environment around the vehicle, such as weather and road surfaces, as well as internal to the vehicle. Information from image sensors 213 (e.g., camera) can be used to determine information about the environment surrounding the vehicle 200 including, for example, information regarding weather, road surfaces and other objects surrounding vehicle 200. For example, image sensors 213 may be able to recognize specific vehicles (e.g., color, vehicle type), landmarks or other features (including, e.g., street signs, traffic lights, etc.), slope of the road, lines on the road, damages and other potentially hazardous conditions to the road, curbs, objects to be avoided (e.g., other vehicles, pedestrians, bicyclists, etc.) and other landmarks or features. Information from image sensors 213 can be used in conjunction with other information such as map data, or information from positioning system 218 to determine, refine, or verify vehicle (ego vehicle or another vehicle) location as well as detect obstructions.

Vehicle positioning system 218 (e.g., GPS or other positioning system) can be used to gather position information about a current location of the vehicle as well as other positioning or navigation information, such as the positioning information about a current location and direction of movement of the vehicle according to a particular road.

Other sensors 219 may be provided as well. Other sensors 219 can include vehicle acceleration sensors, vehicle speed sensors, wheelspin sensors (i.e., one for each wheel), tire pressure monitoring sensors (i.e., one for each tire), vehicle clearance sensors, left-right and front-rear slip ratio sensors, environmental sensors (i.e., to detect weather, traction conditions, or other environmental conditions), seat pressure monitoring sensors (i.e., in the driver seat to measure muscle tension of the driver), motion sensors, electromyography sensors, and microwave sensors. Other sensors 219 can be further included for a given implementation of ADAS. Various sensors 220, such as other sensors 219, may be used to provide input to computing system 210 and other systems of vehicle 200 so that the systems have information useful to determine a crime probability and battery usage of the vehicle 200 for a particular parking location and generate a security plan for the vehicle 200 for the particular parking location.

AV control systems 240 may include a plurality of different systems/subsystems to control operation of vehicle 200. In this example, AV control systems 240 can include, autonomous driving module (not shown), steering unit 236, throttle and brake control unit 235, sensor fusion module 231, computer vision module 234, path and planning module 238, obstacle avoidance module 239, risk assessment module 232 and actuator(s) 237. Sensor fusion module 231 can be included to evaluate data from a plurality of sensors, including sensors 220. Sensor fusion module 231 may use computing system 210 or its own computing system to execute algorithms to assess inputs from the various sensors.

Throttle and brake control unit 235 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (i.e., such as in a hybrid or electric vehicle) to slow or stop the vehicle.

Steering unit 236 may include any of a number of different mechanisms to control or alter the heading of the vehicle. For example, steering unit 236 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 236.

Computer vision module 234 may be included to process image data (e.g., image data captured from image sensors 213, or other image data) to evaluate the environment within or surrounding the vehicle. For example, algorithms operating as part of computer vision module 234 can evaluate still or moving images to determine features and landmarks (e.g., road pavements, lines of the road, damages and other potentially hazardous conditions on the road, road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on. Computer vision module 234 may be able to model the road traffic vehicle network, predict incoming hazards and obstacles, predict road hazard, and determine one or more contributing factors to identifying obstructions. Computer vision module 234 may be able to perform depth estimation, image/video segmentation, camera localization, and object classification according to various classification techniques (including by applied neural networks).

Path and planning module 238 may be included to compute a desired path for vehicle 200 based on input from various other sensors and systems. For example, path and planning module 238 can use information from positioning system 218, sensor fusion module 231, computer vision module 234, obstacle avoidance module 239 (described below) and other systems (e.g., AV control systems 240, sensors 220, and vehicle systems 230) to determine a safe path to navigate the vehicle along a segment of a desired route. Path and planning module 238 may also be configured to dynamically update the vehicle path as real-time information is received from sensors 220 and other control systems 240.

Obstacle avoidance module 239 can be included to determine control inputs necessary to avoid obstacles and obstructions detected by sensors 220 or AV control systems 240. Obstacle avoidance module 239 can work in conjunction with path and planning module 238 to determine an appropriate path to avoid and navigate around obstacles and obstructions.

Path and planning module 238 (either alone or in conjunction with one or more other module of AV control systems 240, such as obstacle avoidance module 239, computer vision module 234, and sensor fusion module 231) may also be configured to perform and coordinate one or more vehicle maneuvers. Example vehicle maneuvers can include at least one of a path tracking, stabilization and collision avoidance maneuver. With connected vehicles, vehicle maneuvers can be performed at least partially cooperatively between the connected vehicles to gather a sufficient amount of data of the environment, including obstructions and traffic. A sufficient amount of data of an obstruction may include collecting data of the obstruction at various angles and perspectives. Each different type of obstruction may warrant a different amount of data to be collected and analyzed to make the needed determinations to verify the obstruction and determine the condition of traffic. For example, data needed to verify a small obstruction, like a small pothole, may be minimal as the connected vehicles collecting verification data of the small pothole obstruction may only need to collect data of missing asphalt on the road. The data needed to verify a larger obstruction, like a downed traffic light, may be much more extensive as the connected vehicles collecting verification data of the downed traffic light obstruction may need to collect data of the portion of the roadway blocked by the downed traffic light, electrical issues present on the roadway, disrupted traffic flow caused by the downed traffic light, including, for example, any other vehicles or objects blocking traffic due to the downed traffic light, additional obstructions on the road caused by the downed traffic light, including, for example, cracks, potholes, debris, etc., and so on. Hence, those of ordinary skill in the art will understand what sufficient means in the context of collecting a sufficient amount of data to verify an obstruction to determine the condition of traffic.

Vehicle systems 230 may include a plurality of different systems/subsystems to control operation of vehicle 200. In this example, vehicle systems 230 include steering system 221, throttle system 222, brakes 223, transmission 224, electronic control unit (ECU) 225, propulsion system 226 and vehicle hardware interfaces 227. The vehicle systems 230 may be controlled by AV control systems 240 in autonomous, semi-autonomous or manual mode of vehicle 200. For example, in autonomous or semi-autonomous mode, AV control systems 240, alone or in conjunction with other systems, can control vehicle systems 230 to operate the vehicle in a fully or semi-autonomous fashion. When control is assumed, computing system 210 and AV control system 230 can provide vehicle control systems to vehicle hardware interfaces for controlled systems such as steering angle 221, brakes 223, throttle 222, or other hardware interfaces 227, such as traction force, turn signals, horn, lights, etc. This may also include an assist mode in which the vehicle takes over partial control or activates ADAS controls (e.g., AC control systems 240) to assist the driver with vehicle operation.

Computing system 210 in the illustrated example includes a processor 206, and memory 203. Some or all of the functions of vehicle 200 may be controlled by computing system 210. Processor 206 can include one or more GPUs, CPUs, microprocessors or any other suitable processing system. Processor 206 may include one or more single core or multicore processors. Processor 206 executes instructions 208 stored in a non-transitory computer readable medium, such as memory 203.

Memory 203 may contain instructions (e.g., program logic) executable by processor 206 to execute various functions of vehicle 200, including those of vehicle systems and subsystems. Memory 203 may contain additional instructions as well, including instructions to transmit data to, receive data from, interact with, and control one or more of the sensors 220, AV control systems 240 and vehicle systems 230. In addition to the instructions, memory 203 may store data and other information used by the vehicle and its systems and subsystems for operation, including operation of vehicle 200 in the autonomous, semi-autonomous or manual modes. For example, memory 203 can include data that has been communicated to the ego vehicle (e.g., via V2V (vehicle-to-vehicle) communication), mapping data, a model of the current or predicted road traffic vehicle network, vehicle dynamics data, computer vision recognition data, and other data which can be useful for the execution of one or more vehicle maneuvers, for example by one or more modules of the AV control systems 240.

Although one computing system 210 is illustrated in FIG. 2, in various applications multiple computing systems 210 can be included. Additionally, one or more systems and subsystems of vehicle 200 can include its own dedicated or shared computing system 210, or a variant thereof. Accordingly, although computing system 210 is illustrated as a discrete computing system, this is for ease of illustration only, and computing system 210 can be distributed among various vehicle systems or components.

Vehicle 200 may also include a (wireless or wired) communication system (not illustrated) to communicate with other vehicles, infrastructure elements, cloud components and other external entities using any of a number of communication protocols including, for example, V2V (vehicle-to-vehicle), V2I (vehicle-to-infrastructure) and V2X (vehicle-to-everything) protocols. Such a wireless communication system may allow vehicle 200 to receive information from other objects including, for example, map data, data regarding infrastructure elements, data regarding operation and intention of surrounding vehicles, and so on. A wireless communication system may allow vehicle 200 to receive updates to data that can be used to execute one or more vehicle control modes, and vehicle control algorithms as discussed herein. Wireless communication system may also allow vehicle 200 to transmit information to other objects and receive information from other objects (such as other vehicles, user devices, or infrastructure). In some applications, one or more communication protocol or dictionaries can be used, such as the SAE J2935 V2X Communications Message Set Dictionary. In some applications, the communication system may be useful in retrieving and sending one or more data useful in detecting and verifying obstructions, as disclosed herein.

Communication system can be configured to receive data and other information from sensors 220 that is used in determining whether and to what extent control mode blending should be activated. Additionally, communication system can be used to send an activation signal or other activation information to various vehicle systems 230 and AV control systems 240 as part of controlling the vehicle. For example, communication system can be used to send signals to one or more of the vehicle actuators 237 to control parameters, for example, maximum steering angle, throttle response, vehicle braking, torque vectoring, and so on.

In some applications, computing functions for various applications disclosed herein may be performed entirely on computing system 210, distributed among two or more computing systems 210 of vehicle 200, performed on a cloud-based platform, performed on an edge-based platform, or performed on a combination of the foregoing.

Path and planning module 238 can allow for executing one or more vehicle control mode(s), and vehicle control algorithms in accordance with various implementations of the systems and methods disclosed herein.

In operation, path and planning module 238 (e.g., by a driver intent estimation module, not shown) can receive information regarding human control input used to operate the vehicle. As described above, information from sensors 220, actuators 237 and other systems can be used to determine the type and level of human control input. Path and planning module 238 can use this information to predict driver action. Path and planning module 238 can use this information to generate a predicted path and model the road traffic vehicle network. This may be useful in evaluating road conditions, determining and verifying obstructions, and determining traffic conditions. As also described above, information from sensors, and other systems can be used to evaluate road conditions, determine and verify obstructions, and determine traffic conditions. Eye state tracking, attention tracking, or intoxication level tracking, for example, can be used to determine vehicle movement patterns according to inherent human behavior. It can be understood that the driver state, time, location of vehicle 200, parking duration of vehicle 200, crime probability, and battery usage of the vehicle 200 can contribute to identify strategic parking for an ego vehicle as disclosed herein. Driver state can be provided to a risk assessment module 232 to determine the level of risk associated with a parking location, determine a crime probability and battery usage of the vehicle 200 for the parking location, and generate a security plan for the vehicle 200 for the parking location. Although not illustrated in FIG. 2, where the assessed risk contributes to determining vehicle movement patterns according to inherent human behaviors, a verification strategy may be generated and provided to vehicle 200 to determine traffic conditions.

Path and planning module 238 can receive state information such as, for example from visibility maps, traffic and weather information, parking information, hazard maps, and local map views. Information from a navigation system can also provide a mission plan including maps and routing to path and planning module 238.

The path and planning module 238 (e.g., by a driver intent estimation module, not shown) can receive this information and predict behavior characteristics within a future time horizon. This information can be used by path and planning module 238 for executing one or more planning decisions. Planning decisions can be based on one or more policy (such as defensive driving policy). Planning decisions can be based on one or more level of autonomy, connected vehicle actions, one or more policy (such as defensive driving policy, cooperative driving policy, such as swarm or platoon formation, leader following, etc.). Path and planning module 238 can generate an expected model for the road traffic hazards and assist in creating a predicted traffic hazard level and verification strategy for vehicles to implement. Path and planning module 238 can generate an expected model for the parking hazards and assist in creating a predicted parking hazard level and parking strategy for vehicles to implement.

Path and planning module 238 can receive risk information from risk assessment module 232. Path and planning module 238 can receive vehicle capability and capacity information from one or more vehicle systems 230. Vehicle capability can be assessed, for example, by receiving information from vehicle hardware interfaces 229 to determine vehicle capabilities and identify a reachable set model. Path and planning module 238 can receive surrounding environment information (e.g., from computer vision module 234, and obstacle avoidance module 239). Path and planning module 238 can apply risk information and vehicle capability and capacity information to trajectory information (e.g., based on a planned trajectory and driver intent) to determine a safe or optimized trajectory for the vehicle given the drivers intent, policies (e.g., safety or vehicle cooperation policies), communicated information, given one or more obstacles in the surrounding environment, road conditions, traffic conditions, etc. Path and planning module 238 can receive parking information (e.g., from computer vision module 234, and risk assessment module 232). This trajectory information can be provided to controller (e.g., ECU 225) to provide partial or full vehicle control in the event of a risk level above threshold. Path and planning module 238 can apply risk information and vehicle capability and capacity information to parking information (e.g., based on parking availability and parking hazard information) to determine a safe or optimal parking location for the vehicle given the vehicle's security system capabilities and policies (e.g., safety or vehicle cooperation policies), communicated information, given one or more parking locations in the surrounding environment, crime data, etc. Information from risk assessment module 232 can be used to generate countermeasures described herein. A signal from risk assessment module 232 can trigger ECU 225 or another AV control system 230 to take over partial or full control of the vehicle.

Figure 3:
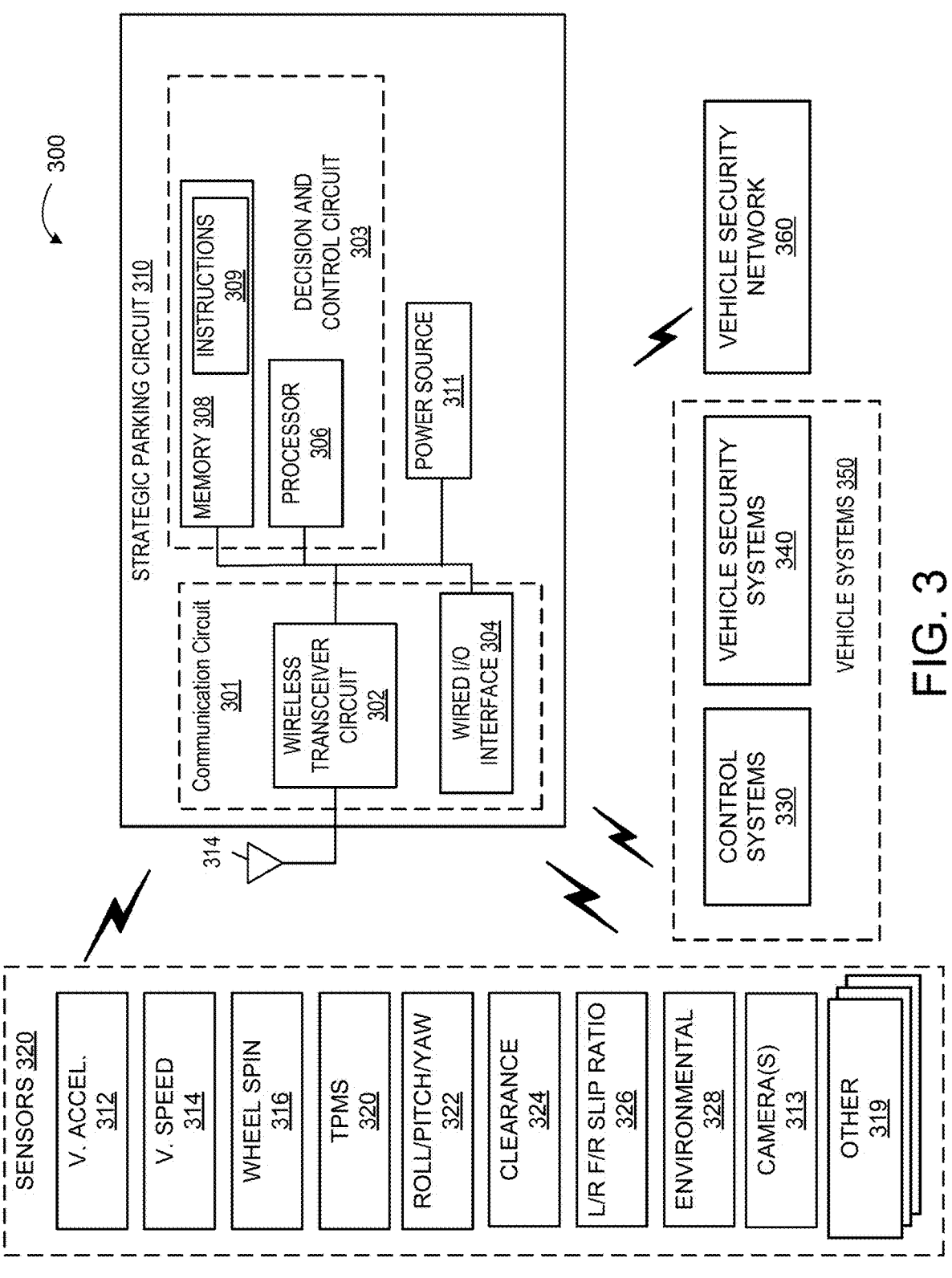
FIG. 3 is an example illustration of a system for identifying strategic parking for a vehicle, according to example applications described in the present disclosure.

FIG. 3 illustrates an example architecture for identifying strategic parking for a vehicle described herein. Referring now to FIG. 3, in this example, a strategic parking system 300 includes a strategic parking circuit 310, a plurality of sensors 320, and a plurality of vehicle systems 350. Also included are various elements of crime and security network 360 with which the strategic parking system 300 can communicate. It can be understood that a crime and security network 360 can include various elements that are important in a crime and security network, such as vehicles, pedestrians (with or without connected devices that can include aspects of strategic parking system 300 disclosed herein), or infrastructure (e.g., traffic signals, sensors, such as traffic cameras, databases, central servers, weather sensors). Other elements of the crime and security network 360 can include connected elements at workplaces, or the home (such as vehicle chargers, connected devices, appliances, etc.).

Strategic parking system 300 can be implemented as and include one or more components of the vehicle 200 shown in FIG. 2. Sensors 320, vehicle systems 350, and elements of vehicle security network 360, can communicate with the strategic parking circuit 310 via a wired or wireless communication interface. As previously alluded to, elements of vehicle security network 360 can correspond to connected or unconnected devices, infrastructure (e.g., traffic signals, sensors, such as traffic cameras, weather sensors), vehicles, pedestrians, objects, etc. that are in a broad or immediate vicinity of an ego-vehicle (e.g., vehicle 150, vehicle 200) or otherwise important to the vehicle security network (such as remote infrastructure). Although sensors 320, vehicle systems 350, and vehicle security network 360, are depicted as communicating with strategic parking circuit 310, they can also communicate with each other, as well as with other vehicle systems 350 and directly with element of a vehicle security network 360.

Data as disclosed herein can be communicated to and from the strategic parking circuit 310. For example, various infrastructure (example element of vehicle security network 360) can include one or more databases, such as vehicle infrastructure data, parking data, crime data, security system data, or vehicle battery data. This data can be communicated to the circuit 310, and such data can be updated based on outcomes for one or more actions or changes to the vehicle security network, vehicle system, security system, crime data, and security data from sensors 320 (e.g., detection of crimes) of the ego vehicle. All of this data can be included in and contribute to predictive analytics (e.g., by machine learning) of crime possibility, battery usage, optimal parking locations, and generation of a security plan. Similarly, models, circuits, and predictive analytics can be updated according to various outcomes.

Strategic parking circuit 310 can evaluate parking data (i.e., time, location and duration), crime data, vehicle data, surveillance data, actions occurring to the ego vehicle, and generate strategic parking settings as described herein. As will be described in more detail herein, the determination of parking locations, crime probability, battery usage data, optimal parking location, and generation of a security plan can have one or more contributing factors. Various sensors 320, vehicle systems 350, and vehicle security network 360 elements may contribute to gathering data for evaluating parking locations, crime data, and vehicle data to determine crime probabilities and battery usage data to be used to generate a security plan for an ego vehicle. For example, the strategic parking circuit 310 can include at least one of a decision and control circuit. The strategic parking circuit 310 can be implemented as an ECU or as part of an ECU such as, for example electronic control unit 225. In other applications, strategic parking circuit 310 can be implemented independently of the ECU, for example, as another vehicle system.

Strategic parking circuit 310 can be configured to evaluate road conditions, detect obstructions, determine traffic conditions, determine driver discomfort levels and appropriately respond by generating strategic parking settings. Strategic parking circuit 310 may include a communication circuit 301 (including either or both of a wireless transceiver circuit 302 with an associated antenna 314 and wired input/output (I/O) interface 304 in this example), a decision and control circuit 303 (including a processor 306 and memory 308 in this example) and a power source 311 (which can include power supply). It is understood that the disclosed strategic parking circuit 310 can be compatible with and support one or more standard or non-standard messaging protocols.

Components of strategic parking circuit 310 are illustrated as communicating with each other via a data bus, although other communication in interfaces can be included. Decision and control circuit 303 can be configured to control one or more aspects of parking location, crime probability, and battery usage determination and response. Decision and control circuit 303 can be configured to execute one or more steps described with reference to FIG. 5 and FIG. 6.

Processor 306 can include a GPU, CPU, microprocessor, or any other suitable processing system. Processor 306 may include one or more single core or multicore processors. Processor 306 executes instructions 309 stored in a non-transitory computer readable medium, such as memory 308. Memory 308 may contain instructions 309 (e.g., program logic) executable by processor 306 to execute various functions of strategic parking system 300, including those of vehicle systems and subsystems. Memory 308 may contain additional instructions as well, including instructions to transmit data to, receive data from, interact with, and control one or more of the sensors 320 and vehicle systems 350. In addition to the instructions, memory 308 may store data and other information used by the strategic parking system 300 and its systems and subsystems for operation. For example, memory 308 can include data that has been communicated to the ego vehicle (e.g. via V2X communication), security data, vehicle dynamics data, computer vision recognition data, and other data which can be useful for the execution of one or more determination of parking locations, crime probability, battery usage, and optimal parking location, and generation of security plans.

The memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308 can be made up of one or more modules of one or more different types of memory, and may be configured to store data and other information as well as operational instructions 309 that may be used by the processor 306 to execute one or more functions of strategic parking circuit 310. For example, data and other information can include vehicle infrastructure data (i.e., the parameters of an ego vehicle), vehicle security data (i.e., the components used for vehicle security), crime data (i.e., the history of crime at a plurality of parking locations), battery usage data (i.e., recorded battery usage information of a plurality of different vehicles), etc. The data can also include values for signals of one or more sensors 320 useful in determining parking data (i.e., time, location and duration), and detecting crime being performed to the ego vehicle. Operational instruction 309 can contain instructions for executing logical circuits, models, and methods as described herein.

Although the example of FIG. 3 is illustrated using processor and memory circuitry, as described below with reference to circuits disclosed herein, decision and control circuit 303 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a strategic parking circuit 310. Components of decision and control circuit 303 can be distributed among two or more decision and control circuits 303, performed on other circuits described with respect to strategic parking circuit 310, be performed on devices (such as cell phones), performed on a cloud-based platform (e.g., part of infrastructure), performed on distributed elements of the vehicle security network 360, such as at multiple vehicles, user device, central servers, performed on an edge-based platform, and performed on a combination of the foregoing.

Communication circuit 301 may include either or both a wireless transceiver circuit 302 with an associated antenna 314 and a wired I/O interface 304 with an associated hardwired data port (not illustrated). As this example illustrates, communications with strategic parking circuit 310 can include either or both wired and wireless communications circuits 301. Wireless transceiver circuit 302 can include a transmitter and a receiver (not shown), e.g., an obstruction detection and verification broadcast mechanism, to allow wireless communications via any of a number of communication protocols such as, for example, WiFi (e.g., IEEE 802.11 standard), Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by road condition detection and verification circuit 310 to/from other components of the ego vehicle, such as sensors 320, vehicle systems 350, infrastructure (e.g., servers cloud-based systems), and other devices or elements of vehicle security network 360. These RF signals can include information of almost any sort that is sent or received by the ego vehicle.

Wired I/O interface 304 can include a transmitter and a receiver (not shown) for hardwired communications with other devices. For example, wired I/O interface 304 can provide a hardwired interface to other components, including sensors 320 and vehicle systems 350. Wired I/O interface 304 can communicate with other devices using Ethernet or any of a number of other wired communication protocols whether standardized, proprietary, open, point-to-point, networked or otherwise.

Power source 311 such as one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, another vehicle battery, alternator, etc.), an energy harvester (e.g., solar cells, piezoelectric system, etc.), or it can include any other suitable power supply. It is understood power source 311 can be coupled to a power source of the ego vehicle, such as a battery and alternator. Power source 311 can be used to power the strategic parking circuit 310.

Sensors 320 can include one or more of the previously mentioned sensors 220 of FIG. 2. Sensors 320 can include one or more sensors that may or not otherwise be included on a standard vehicle (e.g., vehicle 200) with which the strategic parking circuit 310 is implemented. In the illustrated example, sensors 320 include vehicle acceleration sensors 312, vehicle speed sensors 314, wheelspin sensors 316 (e.g., one for each wheel), a tire pressure monitoring system (TPMS) 320, accelerometers such as a 3-axis accelerometer 322 to detect roll, pitch and yaw of the vehicle, vehicle clearance sensors 324, left-right and front-rear slip ratio sensors 326, environmental sensors 328 (e.g., to detect weather, salinity or other environmental conditions), and camera(s) 313 (e.g., front rear, side, top, bottom facing). Additional sensors 319 can also be included as may be appropriate for a given implementation strategic parking system 300.

Vehicle systems 350 can include any of a number of different vehicle components or subsystems used to control or monitor various aspects of the ego vehicle and its performance. For example, it can include any or all of the aforementioned vehicle systems 230 and control systems 240 shown in FIG. 2. The vehicle security system 340 of vehicle systems 350 may control components, such as sensors, of an ego vehicle to monitor and collect surveillance data of the ego vehicle. In this example, the vehicle systems 350 may include a GPS or other vehicle positioning system 218.

During operation, strategic parking circuit 310 can receive information from various vehicle sensors 320, vehicle systems 350, and vehicle security network 360 to determine a plurality of parking locations, determine a plurality of crime probabilities for the plurality of parking locations, determine a plurality of battery usage of an ego vehicle for the plurality of parking locations, analyze the plurality of crime probabilities, analyze the plurality of battery usage, determine an optimal parking location for the ego vehicle, and generate a security plan for the ego vehicle. Also, the driver, owner, and operator of the ego vehicle may manually trigger one or more processes described herein for determining a plurality of parking locations, determining a plurality of crime probabilities for the plurality of parking locations, determining a plurality of battery usage of an ego vehicle for the plurality of parking locations, analyzing the plurality of crime probabilities, analyzing the plurality of battery usage, determining an optimal parking location for the ego vehicle, and generating a security plan for the ego vehicle. Communication circuit 301 can be used to transmit and receive information between the strategic parking circuit 310, sensors 320 and vehicle systems 350. Also, sensors 320 and strategic parking circuit 310 may communicate with vehicle systems 350 directly or indirectly (e.g., via communication circuit 301 or otherwise). Communication circuit 301 can be used to transmit and receive information between strategic parking circuit 310, one or more other systems of an ego vehicle (i.e., vehicle 200), but also other elements of a vehicle security network 360, such as vehicles, devices (e.g., mobile phones), systems, networks (such as a communications network and central server), and infrastructure.

In various applications, communication circuit 301 can be configured to receive data and other information from sensors 320, vehicle systems 350, and vehicle security network 360 that is used to determine a plurality of parking locations, determine a plurality of crime probabilities for the plurality of parking locations, determine a plurality of battery usage of an ego vehicle for the plurality of parking locations, analyze the plurality of crime probabilities, analyze the plurality of battery usage, determine an optimal parking location for the ego vehicle, and generate a security plan for the ego vehicle. As one example, when data is received from an element of vehicle security network 360 (such as from a driver's user device), communication circuit 301 can be used to send an activation signal and activation information to one or more vehicle systems 350 or sensors 320 for the ego vehicle to determine a plurality of parking locations, plurality of crime probabilities, and plurality of battery usage. For example, it may be useful for vehicle systems 350, vehicle security network 360 or sensors 320 to provide data useful in determining parking locations, crime probability, and battery usage.

Alternatively, strategic parking circuit 310 can be continuously receiving information from vehicle system 350, sensors 320, other vehicles, devices and infrastructure (e.g., those that are elements of vehicle security network 360). Further, upon receiving new data, such as, for example, crime data of parking locations, communication circuit 301 can send a signal to other components of the ego vehicle, infrastructure, or other elements of the vehicle security network based on the new crime data. For example, the communication circuit 301 can send a signal to a vehicle system 350 that indicates a control input for performing one or more calculations and analysis of crime probability and battery usage for an ego vehicle according to the new crime data of a particular parking location. The calculations and analysis of the crime probability and battery usage may generate a new security plan for the ego vehicle to implement.

The examples of FIGS. 2 and 3 are provided for illustration purposes only as examples of vehicle 200 and strategic parking system 300 with which applications of the disclosed technology may be implemented. One of ordinary skill in the art reading this description will understand how the disclosed applications can be implemented with vehicle platforms.

Figure 4:
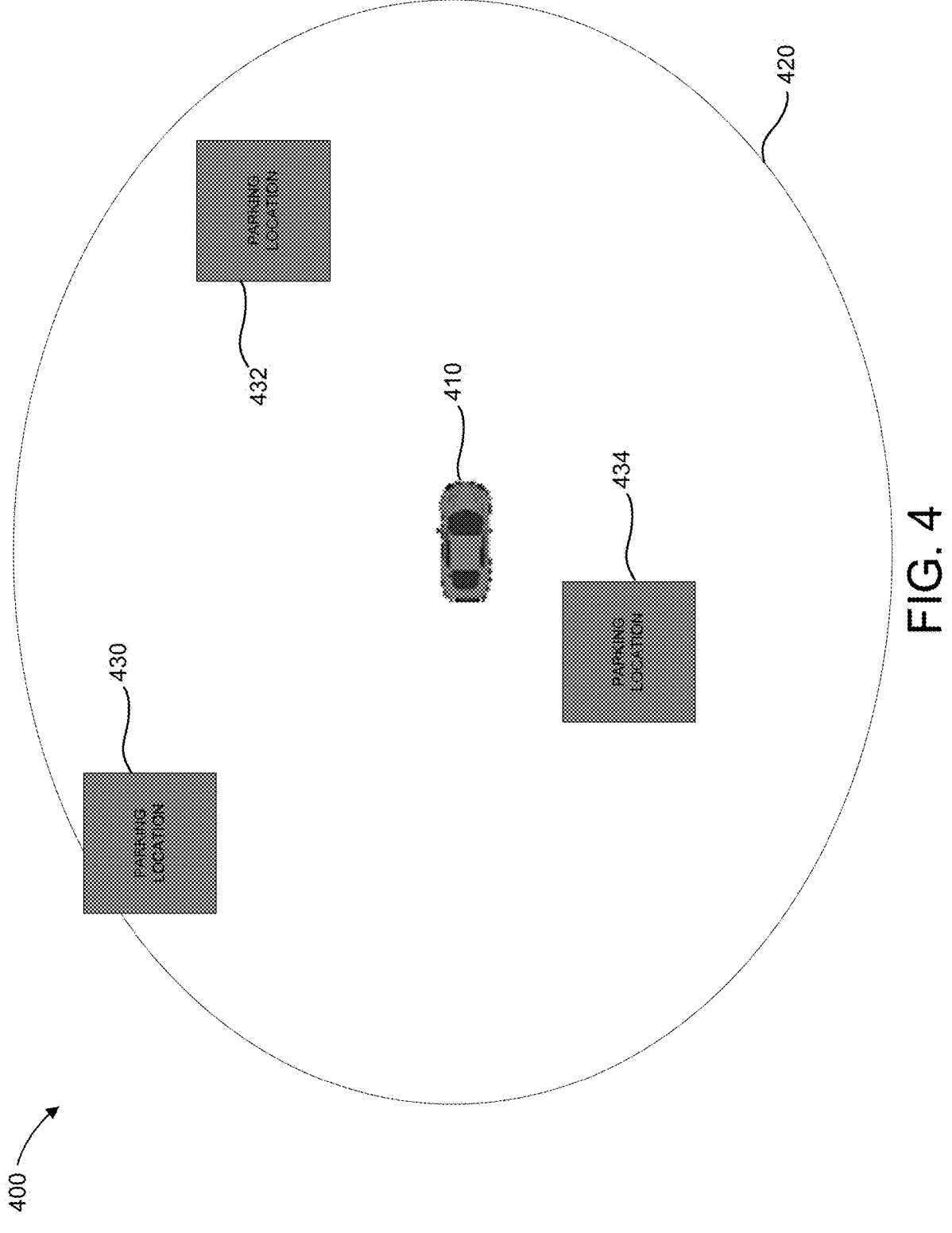
FIG. 4 is an example illustration of a system for identifying strategic parking for a vehicle, according to example applications described in the present disclosure.

FIG. 4 illustrates an example strategic parking system 400. The strategic parking system 400 may be configured to identify available parking locations around an ego vehicle 410. The ego vehicle 410 may include its own, separate strategic parking system 400 that may communicate with the strategic parking system 400 of other vehicles. The ego vehicle 410 and other vehicles may use the same strategic parking system 400. Many variations are possible.

The ego vehicle 410 may include, for example, an automobile, truck, motorcycle, bicycle, scooter, moped, recreational vehicle and other like on- or off-road vehicles. The ego vehicle 410 may include, for example, an autonomous, semi-autonomous and manual operation. The ego vehicle 410 may be used to travel to a particular location. After arriving at the particular location, the ego vehicle 410 may be requested to park at or around the particular location. The strategic parking system 400 may be activated to initiate parking of the ego vehicle 410.

After the strategic parking system 400 is activated, the ego vehicle 410 may collect parking data including, for example, a time, location, and parking duration of the ego vehicle 410 when the strategic parking system 400 is activated. The time may include, for example, a second, minute, hour, day, week, month, and year of a precise moment when the strategic parking system 400 is activated. The location may include, for example, the geographical location of the ego vehicle 410 when the strategic parking system 400 is activated. The parking duration may include, for example, a period of time that the ego vehicle 410 will be parked.

The ego vehicle 410 may collect parking data from input received by the driver when the strategic parking system 400 is activated. The ego vehicle 410 may include one or more sensors that may be used to collect parking data of the ego vehicle 410. The sensors may include, for example, a camera, image sensor, radar sensor, environmental sensor, light detection and ranging (LiDAR) sensor, electromyography sensor, motion sensor, pressure sensor, position sensor, audio sensor, infrared sensor, microwave sensor, optical sensor, haptic sensor, magnetometer, communication system and global positioning system (GPS). Data may be received by at least one sensor of the ego vehicle 410.

If parking data is not received by the ego vehicle 410, either from the driver or by at least one sensor of the ego vehicle 410, then the strategic parking system 400 may assume the missing parking data. For example, one or more sensors of the ego vehicle 410 may be used to collect the parking data of the time and the location of the ego vehicle 410 when the strategic parking system 400 is activated. The strategic parking system 400 may not receive any parking data of the parking duration from the ego vehicle 410. The strategic parking system 400 may assume the parking duration according to one or more contributing factors, including, for example, the location of the ego vehicle 410, the time of day, recorded parking data of previous events with the same or similar environmental settings, etc.

Using the parking data received from the ego vehicle 410 (or assumed), the strategic parking system 400 may survey a perimeter 420 around the location of the ego vehicle 410. Surveying the perimeter 420 around the location of the ego vehicle 410 may determine one or more parking locations, such as parking locations 430, 432 and 434, available for the ego vehicle 410 to park at. A size of the perimeter 420 around the location of the ego vehicle 410 may be preset. The size of the perimeter 420 around the location of the ego vehicle 410 may be adjusted according to one or more contributing factors, including, for example, a maximum distance away from the location of the ego vehicle 410, a surrounding environment around the location of the ego vehicle 410, an availability of parking locations around the location of the ego vehicle 410, a minimum number of parking locations to be found, etc. The one or more parking locations, such as parking locations 430, 432 and 434, may be located within the perimeter 420 around the location of the ego vehicle 410. Many variations are possible.

Figure 5:
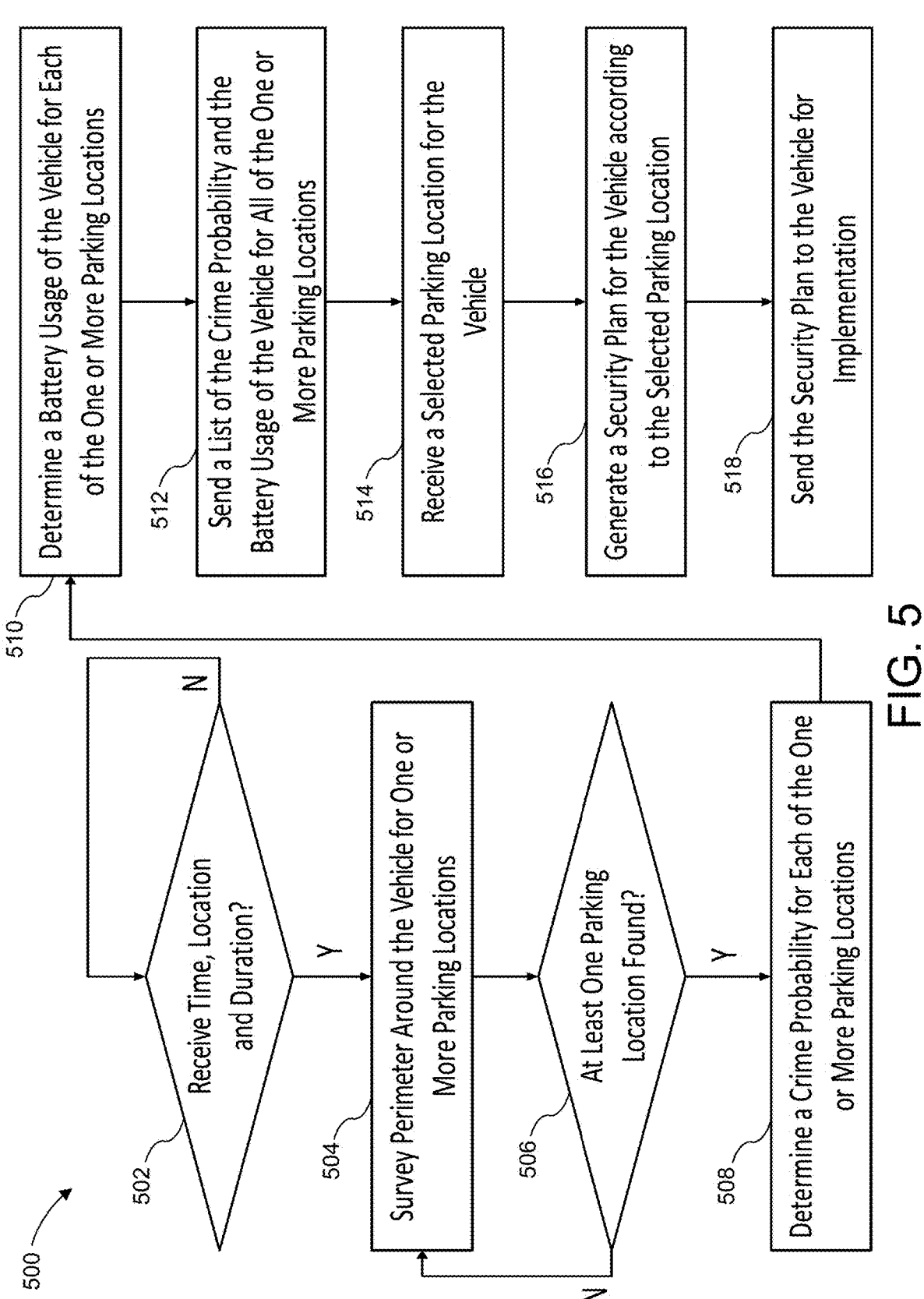
FIG. 5 is an example illustration of a process for identifying strategic parking for a vehicle, according to example applications described in the present disclosure.

FIG. 5 illustrates an example process 500 that includes one or more steps that may be performed to identify strategic parking for an ego vehicle. In some applications, the process 500 can be executed, for example by the computing component 110 of FIG. 1. In another application, the process 500 may be implemented as the computing component 110 of FIG. 1. In other applications, the process 500 may be implemented as, for example, the computing system 210 of FIG. 2, the strategic parking system 300 of FIG. 3, and the strategic parking system 400 of FIG. 4. The process 500 may include a server.

At step 502, the computing component 110 may receive parking data regarding a time, location of a vehicle, and parking duration. An ego vehicle may be used to travel to a particular location. The ego vehicle may include, for example, an automobile, truck, motorcycle, bicycle, scooter, moped, recreational vehicle and other like on- or off-road vehicles. The ego vehicle may include, for example, an autonomous, semi-autonomous and manual operation. After arriving at the particular location, the ego vehicle may be parked at or around the particular location. A strategic parking system may be activated to initiate parking of the ego vehicle.

The ego vehicle may collect parking data including, for example, a time, location, and parking duration of the ego vehicle when the strategic parking system is activated. The time may include, for example, a second, minute, hour, day, week, month, and year of a precise moment when the strategic parking system is activated. The location may include, for example, the geographical location of the ego vehicle when the strategic parking system is activated. The parking duration may include, for example, a period of time that the ego vehicle will be parked.

The ego vehicle may collect parking data from input received by the driver when the strategic parking system is activated. The ego vehicle may include one or more sensors that may be used to collect parking data of the ego vehicle. The sensors may include, for example, a camera, image sensor, radar sensor, environmental sensor, light detection and ranging (LiDAR) sensor, electromyography sensor, motion sensor, pressure sensor, position sensor, audio sensor, infrared sensor, microwave sensor, optical sensor, haptic sensor, magnetometer, communication system and global positioning system (GPS). Data may be received by at least one sensor of the ego vehicle.

If parking data is not received, either from input data by the driver or by at least one sensor of the ego vehicle, then the missing parking data may be assumed. For example, one or more sensors of the ego vehicle may be used to collect the parking data of the time and the location of the ego vehicle when the strategic parking system is activated. The strategic parking system may not receive any parking data of the parking duration from the ego vehicle. The parking duration may be assumed according to one or more contributing factors, including, for example, the location of the ego vehicle, the time of day, recorded parking data of previous events with the same or similar environmental settings, etc.

If parking data regarding time, location and parking duration of the ego vehicle is received (or assumed), then the computing component 110 may proceed to step 504. Otherwise, the computing component 110 may repeat step 502.

At step 504, the computing component 110 may survey a perimeter around the vehicle to determine one or more parking locations according to the location of the vehicle. Using the parking data received from the ego vehicle, a perimeter around the location of the ego vehicle may be surveyed. Surveying the perimeter around the location of the ego vehicle may determine one or more parking locations available for the ego vehicle 410 to park at. A size of the perimeter around the location of the ego vehicle may be preset. The size of the perimeter around the location of the ego vehicle may be adjusted according to one or more contributing factors, including, for example, a maximum distance away from the location of the ego vehicle, a surrounding environment around the location of the ego vehicle, an availability of parking locations around the location of the ego vehicle, a minimum number of parking locations to be found, etc. Many variations are possible.

At step 506, the computing component 110 may determine if at least one parking location is found. After surveying the perimeter around the location of the ego vehicle, one or more parking locations may be found. The one or more parking locations may be located within the perimeter around the location of the ego vehicle. If at least one parking location is found within the perimeter, then the computing component 110 may proceed to step 508. Otherwise, the computing component 110 may repeat step 504 with adjustments made to the settings of the perimeter around the location of the ego vehicle.

At step 508, the computing component 110 may determine a crime probability for a parking location according to the time and the parking duration. Using a first parking location, found from surveying the perimeter around the location of the ego vehicle, may be used to determine a crime probability of the first parking location. To determine the crime probability of the first parking location, crime data of the first parking location may be first received. The crime data may include, for example, information on a history of crime occurring at a particular location, such as, for example, a total number of crimes, types of crimes, results of crimes, level of security (i.e., types of security, frequency of security, and intensity of security), frequency of crimes (i.e., times of day, week, month and year that crimes occur), etc. at the particular location. The crime data of the first parking location may include information on every crime that occurred at the first parking location. The crime data of the first parking location may only include information on vehicle-related crimes that occurred at the first parking location. Many variations are possible.

The crime data of the first parking location may be used to train a crime model. The crime model may be a machine learning (ML) model. The crime model may be used to predict the occurrence of crimes at the first parking location. The crime model, along with the parking data indicating the time and the parking duration of the ego vehicle, may be used to calculate the crime probability of the first parking location. The crime probability of the first parking location for the ego vehicle may include a plurality of vectors between zero (0) and one (1). The crime probability may include a threshold that is used to adjust the value of the plurality of vectors to be either a value of zero (0) or a value of one (1), with zero (0) representing a "no" to crime probability and one (1) representing a "yes" to crime probability. The threshold may be any value between zero (0) and one (1). The threshold may be preset, or it may be adjusted according to one or more contributing factors, including the parking data received.

The crime probability of the first parking location for the ego vehicle may include a plurality of percentages of a likelihood that a crime may be committed at various times throughout the parking duration of the ego vehicle. For example, the crime probability of the first parking location, with a time of 7:00 pm and parking duration of two (2) hours, may display a zero (0) percent likelihood of a crime occurring from 7:00 pm to 7:45 pm, a 15 percent likelihood of a crime occurring from 7:46 pm to 8:00 pm, a five (5) percent likelihood of a crime occurring from 8:01 pm to 8:30 pm, and an eight (8) percent likelihood of a crime occurring from 8:31 pm to 9:00 pm, with 9:00 pm being the end of the parking duration. Many variations are possible. The computing component 110 may determine a crime probability for each of the parking locations at each of the plurality of vectors throughout the parking duration, determined from surveying the perimeter around the ego vehicle.

At step 510, the computing component 110 may determine a battery usage of the vehicle for the first parking location according to the crime probability and a security measure. The crime probability of the first parking location may be used to determine a security measure to be performed at a plurality of time periods throughout the parking duration. The security measure to be performed may include, for example, activating a security system, recording with a camera, monitoring motion around and on the ego vehicle, monitoring audio around the ego vehicle, etc. The security measure to be performed may be based on the crime probability. The security measure to be performed may dynamically increase and decrease according to one or more factors, including the crime probability, battery life of the ego vehicle, etc. For example, a crime probability of 15 percent for a time period of 10 minutes may cause the security measure of recording with a camera of the ego vehicle to be performed. In another example, a crime probability of 15 percent for a time period of 30 minutes may cause the security measure of monitoring motion around and on the ego vehicle to be performed. As another example, a crime probability of five (5) percent for 30 minutes may result in the performance of the security measure of only monitoring audio around the ego vehicle. Many variations are possible.

Using the security measure to be performed according to the crime probability, a plurality of battery life at the plurality of time periods throughout the parking duration may be calculated. The battery life consumed for the performance of a particular security measure may be based on one or more contributing factors, such as, for example, the number of sensors included in the ego vehicle, the sensor capabilities of the ego vehicle, the battery capabilities of the ego vehicle, etc. For example, the computing component 110 may calculate that a battery life of 20 percent may be consumed to operate a security measure of recording with a camera of the ego vehicle for a time period of 10 minutes. In another example, the strategic parking system may calculate that a battery life of 15 percent may be consumed to operate a security measure of monitoring motion around and on the ego vehicle for a time period of 30 minutes. As another example, the computing component 110 may calculate that a battery life of five (5) percent may be consumed to operate a security measure of only monitoring audio around the ego vehicle for a time period of 30 minutes. Many variations are possible.

Stored battery usage data may be retrieved from a database (e.g., local database, remote database, etc.) and used to determine the plurality of battery life throughout the parking duration of the first parking location. The stored battery usage data may include, for example, information of recorded battery usage of one or more other vehicles for the first parking location. The one or more other vehicles may include specifications similar to or exactly the same as the ego vehicle. The stored battery usage data may provide more accurate information that may be used along with the determined security measure to calculate the plurality of battery life at the plurality of time periods.

Once the plurality of battery life at the plurality of time periods is calculated, the battery usage (or estimated battery usage) of the ego vehicle may be determined. The battery usage of the ego vehicle may be the total amount of battery or power from the ego vehicle that is required (or estimated to be required) to operate one or more security measures throughout the parking duration at the first parking location. The battery usage of the ego vehicle may be determined by combining the plurality of battery life calculated for the entire parking duration at the first parking location. The computing component 110 may determine a battery usage for each of the parking locations at each of the plurality of vectors throughout the parking duration, determined from surveying the perimeter around the ego vehicle. The battery usage for each of the parking locations may be determined according to the respective crime probability.

At step 512, the computing component 110 may send a list of the one or more crime probability and one or more battery usage for each of the one or more parking locations. The computing component 110 may determine a plurality of crime probabilities and a plurality of battery usage for a plurality of parking locations determined from surveying a perimeter around the ego vehicle. The plurality of crime probabilities, the plurality of battery usage and the plurality of parking locations may be sent to the ego vehicle and displayed as a list to display the differences in crime probability and battery usage for each of the plurality of parking locations. The list of the plurality of crime probabilities, the plurality of battery usage and the plurality of parking locations may be sent to the ego vehicle for the driver to view.

The list of the plurality of crime probabilities, the plurality of battery usage and the plurality of parking locations may be displayed on a graphical user interface (GUI) of the ego vehicle. The list of the plurality of crime probabilities, the plurality of battery usage and the plurality of parking locations may be arranged in order of the parking location that is the closest to the location of the ego vehicle. The list of the plurality of crime probabilities, the plurality of battery usage and the plurality of parking locations may be arranged in order of the parking location with the lowest crime probability based on the parking data received. The list of the plurality of crime probabilities, the plurality of battery usage and the plurality of parking locations may be arranged in order of the parking location with the lowest battery usage based on the parking data received. The list of the plurality of crime probabilities, the plurality of battery usage and the plurality of parking locations may be arranged in order of the parking location with the shortest distance from the location of the ego vehicle. Many variations are possible.

The computing component 110 may analyze the plurality of crime probabilities for the plurality of parking locations. Analyzing the plurality of crime probabilities for the plurality of parking locations may determine which parking location of the plurality of parking locations has the lowest crime probability for the ego vehicle based on the parking data received. The computing component 110 may analyze the plurality of battery usage for the plurality of parking locations. Analyzing the plurality of battery usage for the plurality of parking locations may determine which parking location of the plurality of parking locations has the lowest battery usage (or lowest estimated battery usage) of the ego vehicle when operating one or more security measures based on the parking data received.

Using the analysis of the plurality of crime probabilities and the analysis of the plurality of battery usage, the computing component 110 may determine which of the plurality of parking locations may be the optimal parking location for the ego vehicle based on the parking data received. The optimal parking location for the ego vehicle may be the parking location that has the optimal, weighted combination of crime probability and battery usage for the ego vehicle based on the received parking data. As an example, the optimal parking location with the optimal, weighted combination of crime probability and battery usage may be the parking location with the lowest crime probability and the lowest battery usage (or lowest estimated battery usage) based on the received parking data for the ego vehicle.

The strategic parking system may use the analysis of the plurality of crime probabilities and the plurality of battery usage with location information, including, for example, the location of the ego vehicle, the location of a current destination, and the location of a future destination, to determine an optimal parking location for the ego vehicle. The current destination may be a place, such as, for example, a restaurant, store, house, etc., that a driver of the ego vehicle may be going to upon parking the ego vehicle. The future destination may be a place, such as, for example, a charging station, house, gas station, etc., that the driver of the ego vehicle may be going to after arriving back to the parked ego vehicle to recharge or refuel the ego vehicle. In this way, the strategic parking system may determine an optimal parking location for the ego vehicle that may allow the ego vehicle to be efficiently monitored using one or more security measures throughout the parking duration while also ensuring the ego vehicle may have sufficient battery life remaining to allow the ego vehicle to reach a future destination to recharge or refuel.

The optimal parking location for the ego vehicle may be the parking location with the optimal, weighted combination of one or more of the crime probability, battery usage, distance from the location of the ego vehicle, distance from the location of the current destination, and distance from the location of the future destination. As an example, a first parking location may have a crime probability of 30 percent, a battery usage of 70 percent and a distance from the current location of the ego vehicle of 0.1 miles. A second parking location may have a crime probability of 30 percent, a battery usage of 30 percent and a distance from the current location of the ego vehicle of 1 mile. The optimal parking location with the optimal, weighted combination of crime probability, battery usage, and distance from the ego vehicle's location may be determined to be the second parking location. As another example, a first parking location may have a crime probability of 25 percent, a battery usage of 80 percent, a distance from the location of the current destination of 1.1 miles, and a distance from the location of the future destination of 25 miles. A second parking location may have a crime probability of 20 percent, a battery usage of 85 percent, a distance from the location of the current destination of 0.2 miles, and a distance from the location of the future destination of 23.5 miles. The optimal parking location with the optimal, weighted combination of crime probability, battery usage, distance from the current destination location, and distance from the future destination location may be determined to be the first parking location. Many variations are possible.

The optimal parking location, along with its respective crime probability, battery usage, and distance of the optimal parking location from the location of the ego vehicle, may be sent to the ego vehicle for the driver to view. The optimal parking location, along with its respective crime probability, battery usage, and distance of the optimal parking location from the location of the ego vehicle, may be highlighted in the list of the plurality of crime probabilities, the plurality of battery usage and the plurality of parking locations sent to the ego vehicle. The optimal parking location, along with its respective crime probability, battery usage, and distance of the optimal parking location from the location of the ego vehicle, may be placed on the top of the list of the plurality of crime probabilities, the plurality of battery usage and the plurality of parking locations sent to the ego vehicle. Information of a minimum battery life needed for the ego vehicle to reach the future destination location may also be sent to the ego vehicle for the driver to view. Many variations are possible.

At step 514, the computing component 110 may receive a selected parking location for the vehicle. After the list of the plurality of crime probabilities, the plurality of battery usage and the plurality of parking locations is sent to the ego vehicle, one of the plurality of parking locations may be selected for the ego vehicle to park at. The computing component 110 may receive information of the selected parking location from the ego vehicle.

At step 516, the computing component 110 may generate a security plan for the vehicle according to the selected parking location. Using the crime probability and battery usage associated with the selected parking location, the computing component 110 may generate a security plan for the ego vehicle. The security plan may include a sequence of security measures to be performed by the ego vehicle according to the crime probability and the battery usage associated with the selected parking location. The security plan may include one or more inactive time periods when no security measure is performed by the ego vehicle according to the crime probability and the battery usage associated with the selected parking location. The security plan may cause the one or more sensors of the ego vehicle to be switched off during the one or more inactive time periods that no security measure is to be performed. The security plan may cause the one or more sensors of the ego vehicle to be switched on when a security measure is to be performed by the ego vehicle. Many variations are possible. In this way, the ego vehicle may conserve battery or power life when no security measures are being performed.

At step 518, the computing component 110 may send the security plan to the vehicle for implementation. The security plan may be sent to the ego vehicle for the ego vehicle to implement. In this way, the ego vehicle may implement one or more security measures according to the security plan to adequately monitor the ego vehicle throughout the parking duration. This may allow the security system of the ego vehicle to be efficiently used to keep the ego vehicle safe and secure throughout the parking duration without causing the ego vehicle to use all of its battery or power.

As the ego vehicle is operating its security system according to the security plan, the ego vehicle may collect information of a crime being committed when a crime is being performed on the ego vehicle. The ego vehicle may collect the crime performance information from at least one sensor of the ego vehicle. The computing component 110 may receive the crime performance information from the ego vehicle. The computing component 110 may send a notification of the crime being performed to a device. The device may be associated to one or more entities, including, for example, the driver of the ego vehicle, an admin of the strategic parking system, a law enforcement agency, a security agency, etc. Many variations are possible.

The computing component 110 may repeat steps 508, 510, and 512 when the computing component 110 collects new data on parking locations found in a perimeter around the location of the ego vehicle, to determine additional crime probability and battery usage for the additional parking locations. The computing component 110 may repeat steps 516 and 518 when the computing component 110 receives a newly selected parking location, to generate a new security plan for the newly selected parking location.

For simplicity of description, the process 500 is described as being performed with respect to a single strategic parking setting. It should be appreciated that, in a typical embodiment, the computing component 110 may manage a change in the parking data of the time, location, and parking duration, crime data, and stored battery usage data, at various times, in short succession of one another. For example, in some embodiments, the computing component 110 can perform many, if not all, of the steps in process 500 on a plurality of combinations of data to generate and update various strategic parking settings for the ego vehicle.

FIG. 6 illustrates an example computing component 600 that includes one or more hardware processors 602 and machine-readable storage media 604 storing a set of machine-readable/machine-executable instructions that, when executed, cause the hardware processor(s) 602 to perform an illustrative method of identifying strategic parking for a vehicle. It should be appreciated that there can be additional, fewer, or alternative steps performed in similar or alternative orders, or in parallel, within the scope of the various examples discussed herein unless otherwise stated. The computing component 600 may be implemented as the computing component 110 of FIG. 1, the computing system 210 of FIG. 2, the strategic parking system 300 of FIG. 3, the strategic parking system 400 of FIG. 4, and the process 500 of FIG. 5.

At step 606, the hardware processor(s) 602 may execute machine-readable/machine-executable instructions stored in the machine-readable storage media 604 to receive parking data regarding a time, location of a vehicle, and parking duration. A driver of an ego vehicle may use the ego vehicle to travel to a particular location. The ego vehicle may include, for example, an automobile, truck, motorcycle, bicycle, scooter, moped, recreational vehicle and other like on- or off-road vehicles. The ego vehicle may include, for example, an autonomous, semi-autonomous and manual operation. After arriving at the particular location, the driver may want to park the ego vehicle at or around the particular location. The driver may initiate parking of the ego vehicle by activating a strategic parking system.

The ego vehicle may collect parking data including, for example, a time, location, and parking duration of the ego vehicle when the strategic parking system is activated. The time may include, for example, a second, minute, hour, day, week, month, and year of a precise moment when the strategic parking system is activated. The location may include, for example, the geographical location of the ego vehicle when the strategic parking system is activated. The parking duration may include, for example, a period of time that the ego vehicle will be parked.

The ego vehicle may collect parking data from input received by the driver when the strategic parking system is activated. The ego vehicle may include one or more sensors that may be used to collect parking data of the ego vehicle. The sensors may include, for example, a camera, image sensor, radar sensor, environmental sensor, light detection and ranging (LiDAR) sensor, electromyography sensor, motion sensor, pressure sensor, position sensor, audio sensor, infrared sensor, microwave sensor, optical sensor, haptic sensor, magnetometer, communication system and global positioning system (GPS). Data may be received by at least one sensor of the ego vehicle.

If parking data is not received by the driver or by at least one sensor of the ego vehicle, then the strategic parking system may assume the missing parking data. For example, one or more sensors of the ego vehicle may be used to collect the parking data of the time and the location of the ego vehicle when the strategic parking system is activated. The strategic parking system may not receive any parking data of the parking duration from the ego vehicle. The strategic parking system may assume the parking duration according to one or more contributing factors, including, for example, the location of the ego vehicle, the time of day, recorded parking data of previous events with the same or similar environmental settings, etc.

At step 608, the hardware processor(s) 602 may execute machine-readable/machine-executable instructions stored in the machine-readable storage media 604 to survey a perimeter around the vehicle to determine a parking location according to the location. After the strategic parking system is activated and parking data is received from the ego vehicle (or assumed), the system may survey a perimeter around the location of the ego vehicle. Surveying the perimeter around the location of the ego vehicle may determine one or more parking locations available for the ego vehicle to park at. A size of the perimeter around the location of the ego vehicle may be preset. The size of the perimeter around the location of the ego vehicle may be adjusted according to one or more contributing factors, including, for example, a maximum distance away from the location of the ego vehicle chosen by the driver, a surrounding environment around the location of the ego vehicle, an availability of parking locations around the location of the ego vehicle, a minimum number of parking locations to be found, etc. Many variations are possible.

At step 610, the hardware processor(s) 602 may execute machine-readable/machine-executable instructions stored in the machine-readable storage media 604 to determine a crime probability for the parking location according to the time and the parking duration. The strategic parking system may use a parking location determined from surveying the perimeter around the ego vehicle to determine a crime probability of the parking location. To determine the crime probability of the parking location, the system may receive crime data of the parking location. The crime data may include, for example, information on a history of crime occurring at a particular location, such as, for example, a total number of crimes, types of crimes, results of crimes, level of security (i.e., the types of security, frequency of security, and intensity of security), frequency of crimes (i.e., times of day, week, month and year that crimes occur), etc. at the particular location. The crime data of the parking location may include information on every crime that occurred at the parking location. The crime data of the parking location may only include information on vehicle-related crimes that occurred at the parking location. Many variations are possible.

The crime data of the parking location may be used to train a crime model. The crime model may be a machine learning (ML) model. The crime model may be used to predict the occurrence of crimes at the parking location. The crime model, along with the parking data of the time and the parking duration of the ego vehicle, may be used to calculate the crime probability of the parking location. The crime probability of the parking location for the ego vehicle may include a plurality of vectors between zero (0) and one (1). The crime probability may include a threshold that is used to adjust the value of the plurality of vectors to be either a value of zero (0) or a value of one (1), with zero (0) representing a "no" to crime probability and one (1) representing a "yes" to crime probability. The threshold may be any value between zero (0) and one (1). The threshold may be preset, or it may be adjusted according to one or more contributing factors, including the parking data received.

The crime probability of the parking location for the ego vehicle may include a plurality of percentages of a likelihood that a crime may be committed at various times throughout the parking duration of the ego vehicle. For example, the crime probability of a first parking location, with a time of 7:00 pm and parking duration of two (2) hours, may display a zero (0) percent likelihood of a crime occurring from 7:00 pm to 7:45 pm, a 15 percent likelihood of a crime occurring from 7:46 pm to 8:00 pm, a five (5) percent likelihood of a crime occurring from 8:01 pm to 8:30 pm, and an eight (8) percent likelihood of a crime occurring from 8:31 pm to 9:00 pm, with 9:00 pm being the end of the parking duration. Many variations are possible. The system may determine a crime probability for each of the parking locations at each of the plurality of vectors throughout the parking duration, determined from surveying the perimeter around the ego vehicle.

At step 612, the hardware processor(s) 602 may execute machine-readable/machine-executable instructions stored in the machine-readable storage media 604 to determine a battery usage of the vehicle for the parking location according to the crime probability and a security measure. The strategic parking system may use the crime probability to determine a security measure to be performed at a plurality of time periods throughout the parking duration. The security measure to be performed may include, for example, activating a security system, recording with a camera, monitoring motion around and on the ego vehicle, monitoring audio around the ego vehicle, etc. The security measure to be performed may be based on the crime probability. The security measure to be performed may dynamically increase and decrease according to one or more factors, including the crime probability, battery life of the ego vehicle, etc. For example, a crime probability of 15 percent for a time period of 10 minutes may cause the security measure of recording with a camera of the ego vehicle to be performed. In another example, a crime probability of 15 percent for a time period of 30 minutes may cause the security measure of monitoring motion around and on the ego vehicle to be performed. As another example, a crime probability of five (5) percent for 30 minutes may result in the performance of the security measure of only monitoring audio around the ego vehicle. Many variations are possible.

Using the security measure to be performed according to the crime probability, the strategic parking system may calculate a plurality of battery life at the plurality of time periods throughout the parking duration. For example, the strategic parking system may calculate that a battery life of 20 percent may be consumed to operate a security measure of recording with a camera of the ego vehicle for a time period of 10 minutes. In another example, the strategic parking system may calculate that a battery life of 15 percent may be consumed to operate a security measure of monitoring motion around and on the ego vehicle for a time period of 30 minutes. As another example, the strategic parking system may calculate that a battery life of five (5) percent may be consumed to operate a security measure of only monitoring audio around the ego vehicle for a time period of 30 minutes. Many variations are possible.

The strategic parking system may receive stored battery usage data from a database (e.g., local database, remote database, etc.). The database may be stored and accessed from a local memory of the ego vehicle, from local memories of other vehicles, and a remote online memory. The stored battery usage data may include, for example, information of recorded battery usage of one or more other vehicles for the parking location. The one or more other vehicles may include specifications similar to or exactly the same as the ego vehicle. The stored battery usage data may provide more accurate information that may be used along with the determined security measure to calculate the plurality of battery life at the plurality of time periods.

Once the plurality of battery life at the plurality of time periods is calculated, the strategic parking system may generate the battery usage (or estimated battery usage) of the ego vehicle. The battery usage of the ego vehicle may be the total amount of battery or power from the ego vehicle that is required (or estimated to be required) to operate one or more security measures throughout the parking duration at the parking location. The battery usage of the ego vehicle may be generated by combining the plurality of battery life calculated for the entire parking duration.

At step 614, the hardware processor(s) 602 may execute machine-readable/machine-executable instructions stored in the machine-readable storage media 604 to generate a security plan for the vehicle according to the crime probability and the battery usage of the vehicle for the parking location. The strategic parking system may use the crime probability and battery usage associated with the parking location to generate a security plan for the ego vehicle. The security plan may include a sequence of security measures to be performed by the ego vehicle according to the crime probability and the battery usage associated with the parking location.

At step 616, the hardware processor(s) 602 may execute machine-readable/machine-executable instructions stored in the machine-readable storage media 604 to send the security plan to the vehicle for the vehicle to implement. The security plan may be sent to the ego vehicle for the ego vehicle to implement at the parking location. In this way, the ego vehicle may implement one or more security measures according to the security plan to adequately monitor the ego vehicle throughout the parking duration when the ego vehicle is parked at the parking location. This may allow the security system of the ego vehicle to be efficiently used to keep the ego vehicle safe and secure throughout the parking duration at the parking location without causing the ego vehicle to use all of its battery or power.

The crime probability, the battery usage and the parking location information may be sent to the ego vehicle for the driver to view. The crime probability, the battery usage and the parking location information may be displayed on a graphical user interface (GUI) of the ego vehicle.

The strategic parking system may determine a plurality of crime probabilities and a plurality of battery usage for a plurality of parking locations determined from surveying a perimeter around the ego vehicle. The plurality of crime probabilities, the plurality of battery usage and the plurality of parking locations may be sent to the ego vehicle and displayed as a list to display the differences in crime probability and battery usage for each of the plurality of parking locations. The list of the plurality of crime probabilities, the plurality of battery usage and the plurality of parking locations may be sent to the ego vehicle for the driver to view.

The list of the plurality of crime probabilities, the plurality of battery usage and the plurality of parking locations may be displayed on a graphical user interface (GUI) of the ego vehicle. The list of the plurality of crime probabilities, the plurality of battery usage and the plurality of parking locations may be arranged in order of the parking location that is the closest to the location of the ego vehicle. The list of the plurality of crime probabilities, the plurality of battery usage and the plurality of parking locations may be arranged in order of the parking location with the lowest crime probability based on the parking data received. The list of the plurality of crime probabilities, the plurality of battery usage and the plurality of parking locations may be arranged in order of the parking location with the lowest battery usage based on the parking data received. The list of the plurality of crime probabilities, the plurality of battery usage and the plurality of parking locations may be arranged in order of the parking location with the shortest distance from the location of the ego vehicle. Many variations are possible.

The strategic parking system may analyze the plurality of crime probabilities for the plurality of parking locations. Analyzing the plurality of crime probabilities for the plurality of parking locations may determine which parking location of the plurality of parking locations has the lowest crime probability for the ego vehicle based on the parking data received. The strategic parking system may analyze the plurality of battery usage for the plurality of parking locations. Analyzing the plurality of battery usage for the plurality of parking locations may determine which parking location of the plurality of parking locations has the lowest battery usage (or lowest estimated battery usage) of the ego vehicle when operating one or more security measures based on the parking data received.

Using the analysis of the plurality of crime probabilities and the analysis of the plurality of battery usage, the strategic parking system may determine which of the plurality of parking locations may be the optimal parking location for the ego vehicle based on the parking data received. The optimal parking location for the ego vehicle may be the parking location that has the optimal, weighted combination of crime probability and battery usage for the ego vehicle based on the received parking data. As an example, the optimal parking location with the optimal, weighted combination of crime probability and battery usage may be the parking location with the lowest crime probability and the lowest battery usage based on the received parking data for the ego vehicle.

The strategic parking system may use the analysis of the plurality of crime probabilities and the plurality of battery usage with location information, including, for example, the location of the ego vehicle, the location of a current destination, and the location of a future destination, to determine an optimal parking location for the ego vehicle. The current destination may be a place, such as, for example, a restaurant, store, house, etc., that a driver of the ego vehicle may be going to upon parking the ego vehicle. The future destination may be a place, such as, for example, a charging station, house, gas station, etc., that the driver of the ego vehicle may be going to after arriving back to the parked ego vehicle to recharge or refuel the ego vehicle. In this way, the strategic parking system may determine an optimal parking location for the ego vehicle that may allow the ego vehicle to be efficiently monitored using one or more security measures throughout the parking duration while also ensuring the ego vehicle may have sufficient battery life remaining to allow the ego vehicle to reach a future destination to recharge or refuel.

The optimal parking location for the ego vehicle may be the parking location with the optimal, weighted combination of one or more of the crime probability, battery usage, distance from the location of the ego vehicle, distance from the location of the current destination, and distance from the location of the future destination. As an example, a first parking location may have a crime probability of 30 percent, a battery usage of 70 percent and a distance from the current location of the ego vehicle of 0.1 miles. A second parking location may have a crime probability of 30 percent, a battery usage of 30 percent and a distance from the current location of the ego vehicle of 1 mile. The optimal parking location with the optimal, weighted combination of crime probability, battery usage, and distance from the ego vehicle's location may be determined to be the second parking location. As another example, a first parking location may have a crime probability of 25 percent, a battery usage of 80 percent, a distance from the location of the current destination of 1.1 miles, and a distance from the location of the future destination of 25 miles. A second parking location may have a crime probability of 20 percent, a battery usage of 85 percent, a distance from the location of the current destination of 0.2 miles, and a distance from the location of the future destination of 23.5 miles. The optimal parking location with the optimal, weighted combination of crime probability, battery usage, distance from the current destination location, and distance from the future destination location may be determined to be the first parking location. Many variations are possible.

The optimal parking location, along with its respective crime probability, battery usage, and distance of the optimal parking location from the location of the ego vehicle, may be sent to the ego vehicle for the driver to view. The optimal parking location, along with its respective crime probability, battery usage, and distance of the optimal parking location from the location of the ego vehicle, may be highlighted in the list of the plurality of crime probabilities, the plurality of battery usage and the plurality of parking locations sent to the ego vehicle. The optimal parking location, along with its respective crime probability, battery usage, and distance of the optimal parking location from the location of the ego vehicle, may be placed on the top of the list of the plurality of crime probabilities, the plurality of battery usage and the plurality of parking locations sent to the ego vehicle. Information of a minimum battery life needed for the ego vehicle to reach the future destination location may also be sent to the ego vehicle for the driver to view. Many variations are possible.

After the strategic parking system sends the list of the plurality of crime probabilities, the plurality of battery usage and the plurality of parking locations sent to the ego vehicle, the driver may view the list and select a parking location to park the ego vehicle at. The strategic parking system may receive information of the selected parking location from the ego vehicle. The strategic parking system may use the crime probability and battery usage associated with the selected parking location to generate a security plan for the ego vehicle. The security plan may include a sequence of security measures to be performed by the ego vehicle according to the crime probability and the battery usage associated with the selected parking location. The security plan may be sent to the ego vehicle for the ego vehicle to implement. In this way, the ego vehicle may implement one or more security measures according to the security plan to adequately monitor the ego vehicle throughout the parking duration when the ego vehicle is parked at the selected parking location. This may allow the security system of the ego vehicle to be efficiently used to keep the ego vehicle safe and secure throughout the parking duration at the selected parking location without causing the ego vehicle to use all of its battery or power.

As the ego vehicle is operating its security system according to the security plan provided by the strategic system, the ego vehicle may collect information that a crime is being performed on the ego vehicle. The ego vehicle may collect the crime performance information from at least one sensor of the ego vehicle. The strategic parking system may receive the crime performance information from the ego vehicle. The strategic parking system may send a notification of the crime being performed to a device. The device may be associated to one or more entities, including, for example, the driver of the ego vehicle, an admin of the strategic parking system, a law enforcement agency, a security agency, etc. Many variations are possible.

Figure 7:
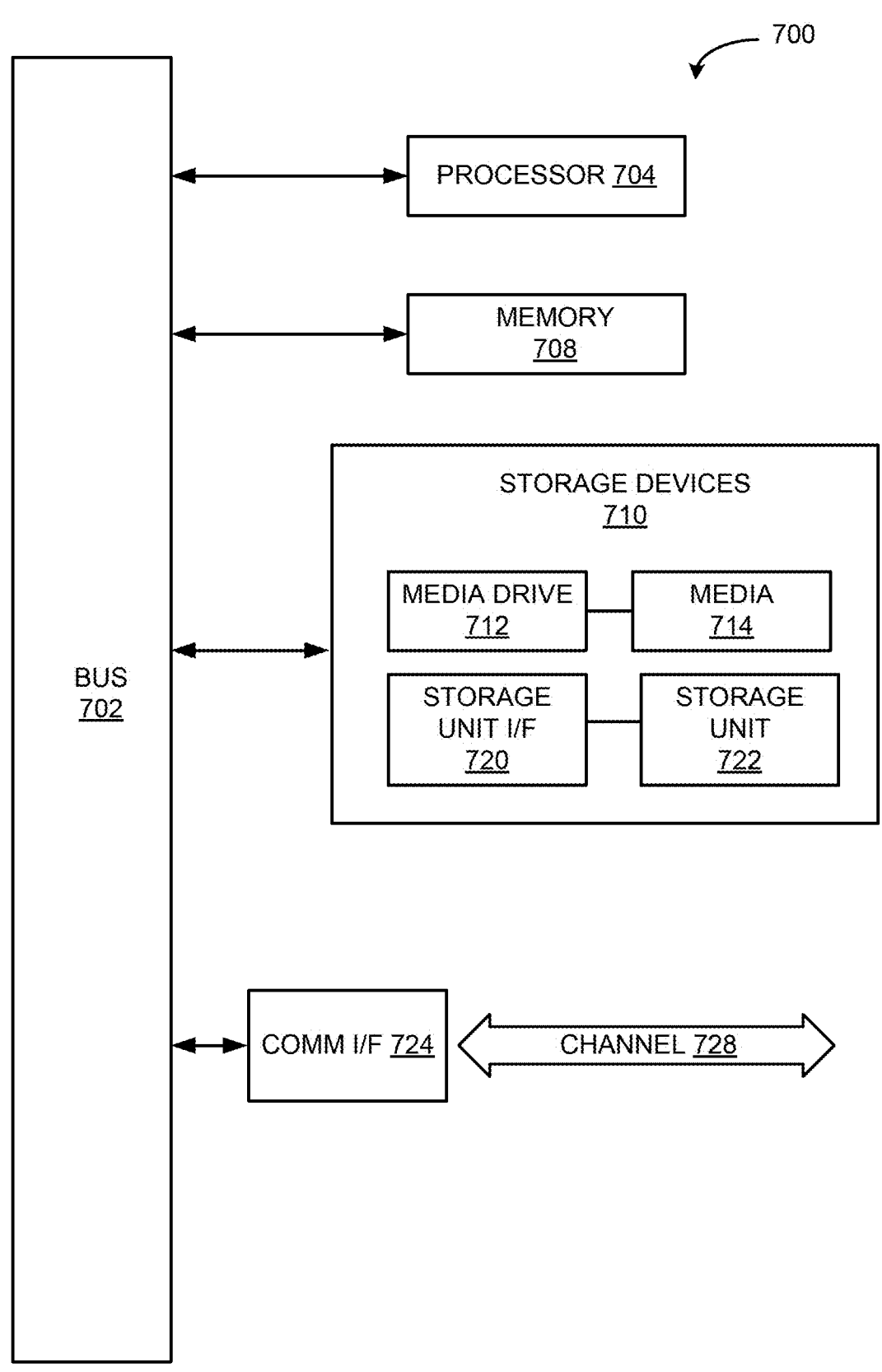
FIG. 7 is an example illustration of a computing component that may be used to implement various features of embodiments described in the present disclosure.

As used herein, the terms circuit, system, and component might describe a given unit of functionality that can be performed in accordance with one or more applications of the present application. As used herein, a component might be implemented utilizing any form of hardware, software, or a combination thereof. For example, one or more processors, controllers, ASICS, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software (such as user device applications described herein), these software elements can be implemented to operate with a computing or processing component capable of carrying out the functionality described with respect thereto. One such example computing component is shown in FIG. 7. Various applications are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a vehicle (e.g., vehicle 150, vehicle 200), user device, self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability. In another example, a computing component might be found in components making up vehicle 150, vehicle 200, strategic parking circuit 310, decision and control circuit 303, computing system 100, computing system 210, ECU 225, etc.

Computing component 700 might include, for example, one or more processors, controllers, control components, or other processing devices. This can include a processor, and any one or more of the components making up vehicle 150 of FIG. 1, vehicle 200 of FIG. 2, computing system 210 of FIG. 2, strategic parking system 300 of FIG. 3, and strategic parking system 400 of FIG. 4. Processor 704 might be implemented using a general-purpose or special-purpose processing engine such as, for example, a microprocessor, controller, or other control logic. The processor 704 might be specifically configured to execute one or more instructions for execution of logic of one or more circuits described herein, such as strategic parking circuit 310, decision and control circuit 303, and logic for control systems 240. Processor 704 may be configured to execute one or more instructions for performing one or more methods, such as the process described in FIG. 5 and the method described in FIG. 6.

Processor 704 may be connected to a bus 702. However, any communication medium can be used to facilitate interaction with other components of computing component 700 or to communicate externally. In applications, processor 704 may fetch, decode, and execute one or more instructions to control processes and operations for enabling vehicle servicing as described herein. For example, instructions can correspond to steps for performing one or more steps of the process described in FIG. 5 and the method described in FIG. 6.

Computing component 700 might also include one or more memory components, simply referred to herein as main memory 708. For example, random access memory (RAM) or other dynamic memory, might be used for storing information and instructions to be fetched, decoded, and executed by processor 704. Such instructions may include one or more instructions for execution of one or more logical circuits described herein. Instructions can include instructions 208 of FIG. 2, and instructions 309 of FIG. 3 as described herein, for example. Main memory 708 might also be used for storing temporary variables or other intermediate information during execution of instructions to be fetched, decoded, and executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative applications, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage unit 722 and interface 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communication port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, Controller Area Network (CAN), and other wired or wireless communications channels.

In this document, the terms "computer program medium" and "computer usable medium" are used to generally refer to transitory or non-transitory media. Such media may be, e.g., memory 708, storage unit 722, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

As described herein, vehicles can be flying, partially submersible, submersible, boats, roadway, off-road, passenger, truck, trolley, train, drones, motorcycle, bicycle, or other vehicles. As used herein, vehicles can be any form of powered or unpowered transport.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof. While various applications of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various applications be implemented to perform the recited functionality in the same order, and with each of the steps shown, unless the context dictates otherwise.

Although the disclosed technology is described above in terms of various exemplary applications and implementations, it should be understood that the various features, aspects and functionality described in one or more of the individual applications are not limited in their applicability to the particular application with which they are described, but instead can be applied, alone or in various combinations, to one or more of the other applications of the disclosed technology, whether or not such applications are described and whether or not such features are presented as being a part of a described application. Thus, the breadth and scope of the technology disclosed herein should not be limited by any of the above-described exemplary applications.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various applications set forth herein are described in terms of exemplary block diagrams, flow charts and other illustrations. As will become apparent to one of ordinary skill in the art after reading this document, the illustrated applications and their various alternatives can be implemented without confinement to the illustrated examples. For example, block diagrams and their accompanying description should not be construed as mandating a particular architecture or configuration.

What is claimed is:

1. A computer implemented method for identifying strategic parking for a vehicle, the method comprising:
   receiving, from the vehicle, parking data regarding a time, location of the vehicle, and parking duration of the vehicle;
   surveying a perimeter around the vehicle to determine a parking location according to the location of the vehicle;
   determining a crime probability for the parking location according to the time and the parking duration of the vehicle;
   determining a battery usage of the vehicle for the parking location according to the crime probability and a security measure to be performed;
   generating a security plan for the vehicle according to the crime probability and the battery usage of the vehicle for the parking location; and
   sending the security plan to the vehicle and controlling the vehicle according to the security plan at the parking location.

2. The method of claim 1, further comprising:
   analyzing a plurality of crime probabilities for a plurality of parking locations according to the location of the vehicle, wherein the plurality of crime probabilities includes the crime probability and the plurality of parking locations includes the parking location;

analyzing a plurality of battery usage of the vehicle for the plurality of parking locations, wherein the plurality of battery usage includes the battery usage for the parking location;

determining an optimal parking location for the vehicle to park from the plurality of parking locations according to the analysis of the plurality of crime probabilities and the analysis of the plurality of battery usage; and sending, to the vehicle, the optimal parking location, crime probability for the optimal parking location, and battery usage of the vehicle for the optimal parking location.

3. The method of claim 1, wherein the time comprises a second, minute, hour, day, week, month, and year of a particular moment.

4. The method of claim 1, wherein the parking duration comprises an overall period of time for parking the vehicle.

5. The method of claim 1, wherein the determining the crime probability for the parking location comprises:

receiving crime data of the parking location;

training a crime model using the crime data; and calculating the crime probability for the parking location according to the crime model, the time, and the parking duration of the vehicle.

6. The method of claim 5, wherein the crime data comprises information on a history of crime occurring at a particular location, with the history of crime comprising a total number of crimes, types of crimes, results of crimes, and level of security.

7. The method of claim 1, wherein the crime probability comprises a plurality of likelihood of crime percentages at a plurality of time periods throughout the parking duration.

8. The method of claim 1, wherein the determining the battery usage of the vehicle comprises:

determining the security measure to be performed at a plurality of time periods throughout the parking duration according to the crime probability;

calculating a plurality of battery life to be consumed at the plurality of time periods throughout the parking duration according to the security measure to be performed; and generating the battery usage of the vehicle by combining the plurality of battery life of the plurality of time periods throughout the parking duration.

9. The method of claim 1, wherein the determining the battery usage of the vehicle comprises:

receiving stored battery usage data from a database, with the stored battery usage data comprising information of recorded battery usage of a first vehicle for the parking location, wherein the first vehicle has similar specifications to the vehicle;

determining the security measure to be performed at a plurality of time periods throughout the parking duration according to the crime probability;

calculating a plurality of battery life to be consumed at the plurality of time periods throughout the parking duration according to the security measure to be performed and the stored battery usage data; and generating the battery usage of the vehicle by combining the plurality of battery life of the plurality of time periods throughout the parking duration.

10. The method of claim 1, wherein the security measure comprises at least one of recording with a camera, activating a security system, monitoring motion around and on the vehicle, and monitoring audio around the vehicle, with the security measure to be performed being based on the crime probability.

11. The method of claim 1, further comprising:

receiving information of a selected parking location from the vehicle;

generating a second security plan for the vehicle according to a second crime probability and a second battery usage of the vehicle for the selected parking location; and sending the second security plan to the vehicle for the vehicle to implement at the selected parking location.

12. The method of claim 1, wherein the security plan comprises a sequence of security measures to be performed by the vehicle according to the crime probability and the battery usage for the parking location.

13. The method of claim 1, further comprising:

receiving, from the vehicle, information that a crime is being performed on the vehicle; and sending a notification of the crime being performed to a device.

14. A computer system for identifying strategic parking for a vehicle, the system comprising:

one or more processors; and memory coupled to the one or more processors to store instructions, which when executed by the one or more processors, cause the one or more processors to perform operations, the operations comprising:

receiving parking data regarding a time, location of the vehicle, and parking duration of the vehicle;

surveying a perimeter around the vehicle to determine a parking location according to the location of the vehicle;

determining a crime probability for the parking location according to the time and the parking duration of the vehicle;

determining a battery usage of the vehicle for the parking location according to the crime probability and a security measure to be performed;

generating a security plan for the vehicle according to the crime probability and the battery usage of the vehicle for the parking location; and sending the security plan to the vehicle and controlling the vehicle according to the security plan at the parking location.

15. The system of claim 14, wherein the operations further comprise:

analyzing a plurality of crime probabilities for a plurality of parking locations according to the location of the vehicle, wherein the plurality of crime probabilities includes the crime probability and the plurality of parking locations includes the parking location;

analyzing a plurality of battery usage of the vehicle for the plurality of parking locations, wherein the plurality of battery usage includes the battery usage for the parking location;

determining an optimal parking location for the vehicle to park from the plurality of parking locations according to the analysis of the plurality of crime probabilities and the analysis of the plurality of battery usage; and sending, to the vehicle, the optimal parking location, crime probability for the optimal parking location, and battery usage of the vehicle for the optimal parking location.

16. The system of claim 14, wherein the determining the crime probability for the parking location comprises:

receiving crime data of the parking location;

training a crime model using the crime data; and calculating the crime probability for the parking location according to the crime model, the time, and the parking duration of the vehicle.

17. The system of claim 14, wherein the determining the battery usage of the vehicle comprises:

determining the security measure to be performed at a plurality of time periods throughout the parking duration according to the crime probability;

calculating a plurality of battery life to be consumed at the plurality of time periods throughout the parking duration according to the security measure to be performed; and generating the battery usage of the vehicle by combining the plurality of battery life of the plurality of time periods throughout the parking duration.

18. The system of claim 14, wherein the determining the battery usage of the vehicle comprises:

receiving stored battery usage data from a database, with the stored battery usage data comprising information of recorded battery usage of a first vehicle for the parking location, wherein the first vehicle has similar specifications to the vehicle;

determining the security measure to be performed at a plurality of time periods throughout the parking duration according to the crime probability;

calculating a plurality of battery life to be consumed at the plurality of time periods throughout the parking duration according to the security measure to be performed and the stored battery usage data; and generating the battery usage of the vehicle by combining the plurality of battery life of the plurality of time periods throughout the parking duration.

19. The system of claim 14, wherein the operations further comprise:

receiving information of a selected parking location from the vehicle;

generating a second security plan for the vehicle according to a second crime probability and a second battery usage of the vehicle for the selected parking location; and sending the second security plan to the vehicle for the vehicle to implement at the selected parking location.

20. A non-transitory machine-readable medium having instructions stored therein, which when executed by a processor, cause the processor to perform operations, the operations comprising:

receiving parking data regarding a time, location of a vehicle, and parking duration of the vehicle;

surveying a perimeter around the vehicle to determine a parking location according to the location of the vehicle;

determining a crime probability for the parking location according to the time and the parking duration of the vehicle;

determining a battery usage of the vehicle for the parking location according to the crime probability and a security measure to be performed;

generating a security plan for the vehicle according to the crime probability and the battery usage of the vehicle for the parking location; and sending the security plan to the vehicle and controlling the vehicle according to the security plan at the parking location.

* * * * *